(12) United States Patent
Park et al.

(10) Patent No.: US 10,921,700 B2
(45) Date of Patent: Feb. 16, 2021

(54) PROJECTOR

(71) Applicant: Maxell, Ltd., Kyoto (JP)

(72) Inventors: Minjoo Park, Oyamazaki (JP); Kazuo Shikita, Oyamazaki (JP); Chiaki Kinno, Oyamazaki (JP); Akihiro Shiraishi, Oyamazaki (JP); Takuya Shimizu, Oyamazaki (JP); Hiroshi Nakamori, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/963,275

(22) PCT Filed: Jan. 23, 2019

(86) PCT No.: PCT/JP2019/002028
§ 371 (c)(1),
(2) Date: Jul. 20, 2020

(87) PCT Pub. No.: WO2019/151071
PCT Pub. Date: Aug. 8, 2019

(65) Prior Publication Data
US 2020/0341361 A1    Oct. 29, 2020

(30) Foreign Application Priority Data
Feb. 2, 2018  (JP) .................................. 2018-017194

(51) Int. Cl.
*G03B 21/14* (2006.01)
*H04N 9/31* (2006.01)
*G03B 21/20* (2006.01)

(52) U.S. Cl.
CPC ......... *G03B 21/204* (2013.01); *G03B 21/208* (2013.01); *G03B 21/2066* (2013.01); *H04N 9/315* (2013.01)

(58) Field of Classification Search
CPC .. G03B 21/14; G03B 21/204; G03B 21/2066; G03B 21/006; H04N 9/31; H04N 9/3164; H04N 9/3161
See application file for complete search history.

(56) References Cited

U.S. PATENT DOCUMENTS

| | | | |
|---|---|---|---|
| 9,651,853 B2 * | 5/2017 | Arakawa | H01L 33/505 |
| 2015/0204517 A1 * | 7/2015 | Arakawa | G03B 21/204 |
| | | | 353/84 |

(Continued)

FOREIGN PATENT DOCUMENTS

| | | |
|---|---|---|
| JP | 2012-15001 A | 1/2012 |
| JP | 2016-512340 A | 4/2016 |

(Continued)

OTHER PUBLICATIONS

International Search Report of PCT/JP2019/002028 dated Apr. 2, 2019.

*Primary Examiner* — William C. Dowling
(74) *Attorney, Agent, or Firm* — Mattingly & Malur, PC

(57) ABSTRACT

The projector appropriately generates white light from a laser light source and uses the white light for image display. A white light generator that generates white light from blue light and yellow light includes a dichroic mirror that is irradiated with blue light from a blue laser, a first condenser lens that focuses the blue light that has passed through the dichroic mirror, a diffusion plate that diffuses the focused blue light, a second condenser lens that focuses the blue light obtained by allowing the diffused blue light to pass through the dichroic mirror, and a phosphor that is irradiated with the focused blue light to emit yellow light; the diffusion plate is an alumina ceramic plate; the dichroic mirror has a first region that transmits one of the blue light and the yellow light and reflects the other and a second region that reflects or transmits both.

9 Claims, 17 Drawing Sheets

(56) References Cited

U.S. PATENT DOCUMENTS

| | | | |
|---|---|---|---|
| 2016/0004147 A1 | 1/2016 | Hu et al. | |
| 2016/0088273 A1* | 3/2016 | Fukui | F21V 9/08 353/31 |
| 2016/0327851 A1* | 11/2016 | Liao | G03B 21/2066 |
| 2017/0350562 A1 | 12/2017 | Khrushchev | |
| 2018/0239228 A1 | 8/2018 | Akiyama et al. | |
| 2019/0302600 A1* | 10/2019 | Arakawa | G03B 21/204 |

FOREIGN PATENT DOCUMENTS

| | | |
|---|---|---|
| JP | 2017-15966 A | 1/2017 |
| JP | 2017-129748 A | 7/2017 |
| WO | 2016/143274 A1 | 9/2016 |

\* cited by examiner

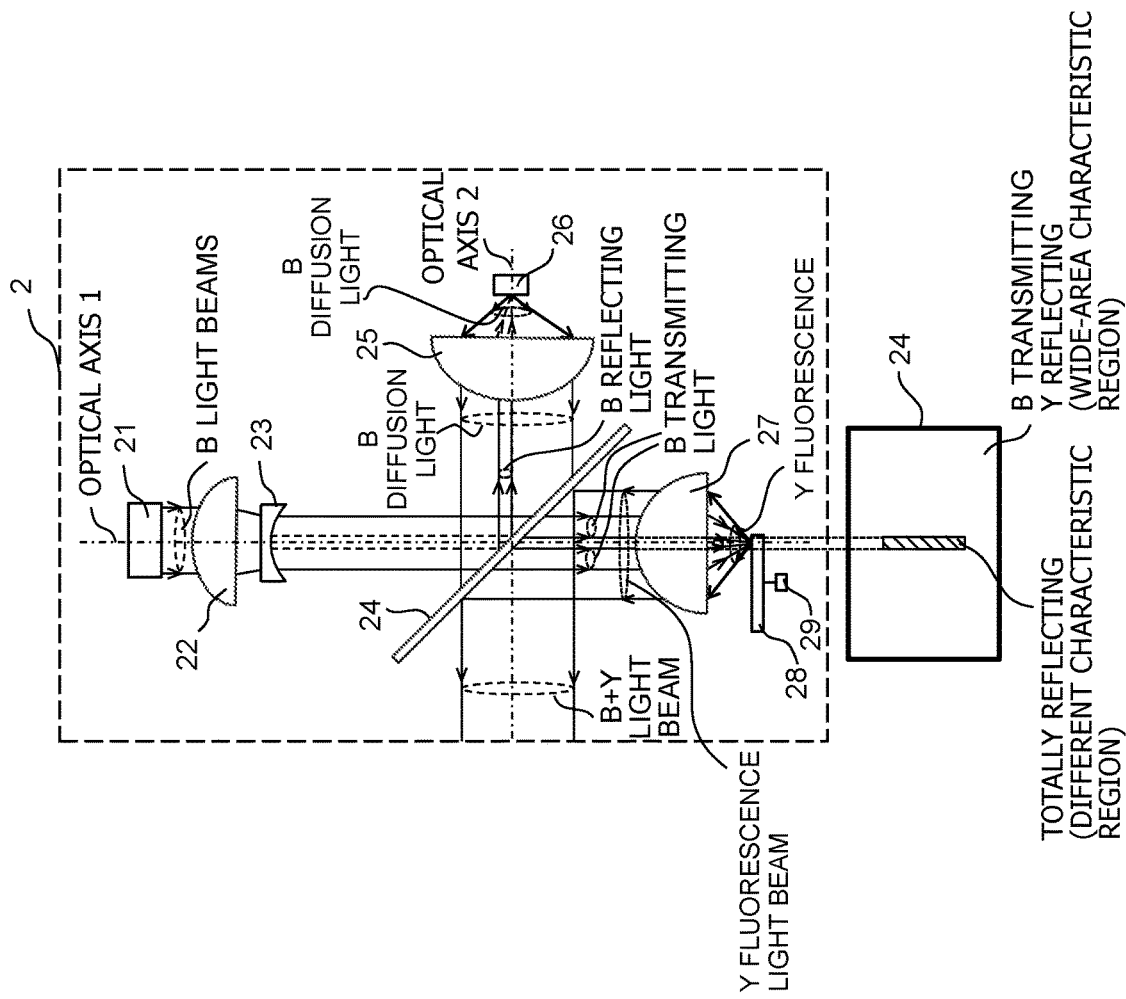

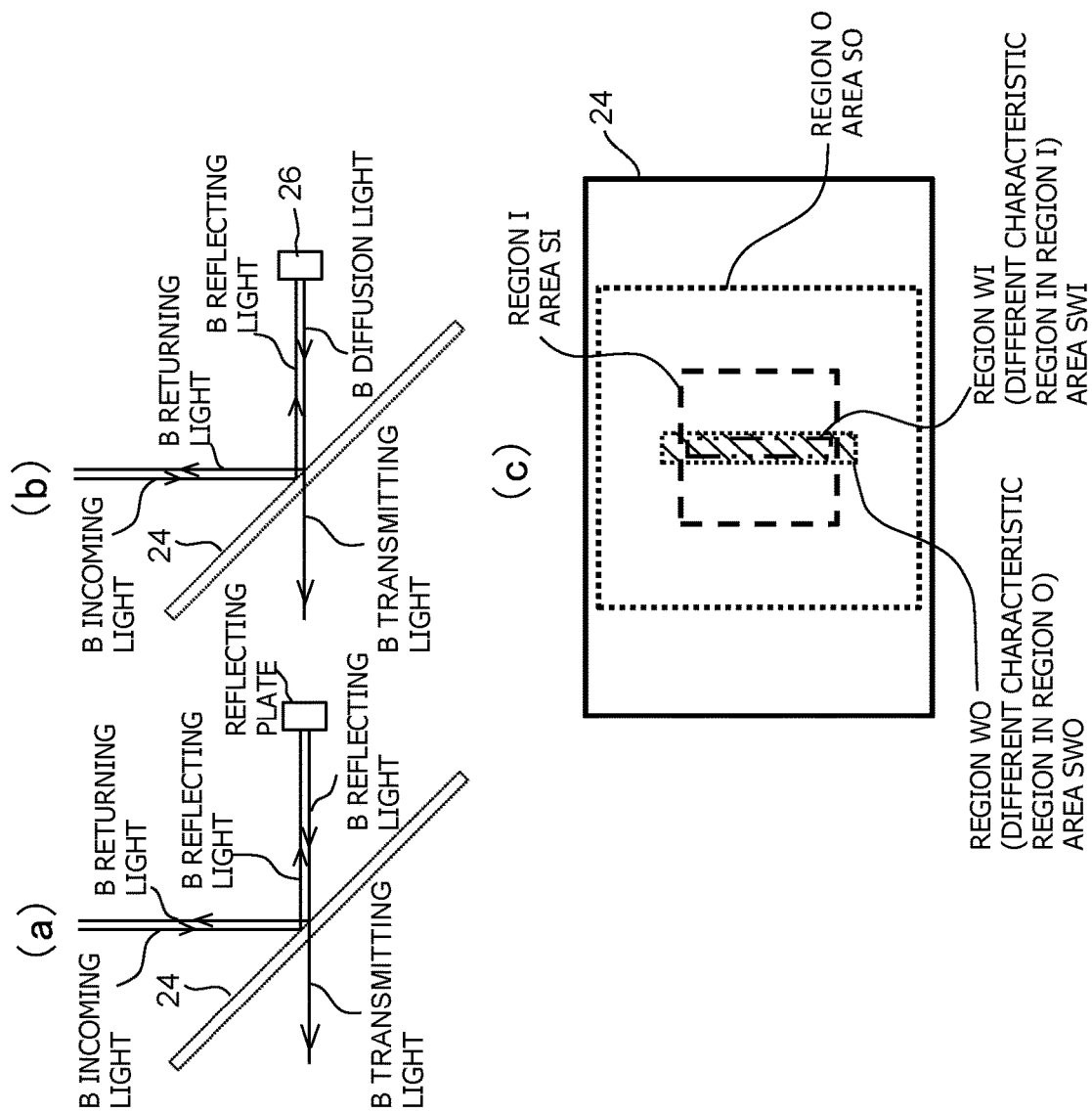

REGION WI = REGION WO
(DIFFERENT CHARACTERISTIC REGION IN REGION I =
DIFFERENT CHARACTERISTIC REGION IN REGION O)
AREA SWI = AREA SWO

FIG. 23

| TYPE OF DIFFUSION PLATE | SUBSTRATE MATERIAL | PROCESSING CONTENTS | DIFFUSION ANGLE θO OF OUTGOING LIGHT | NOISE SUCH AS SPECKLE | OVERALL COST |
|---|---|---|---|---|---|
| TYPE A: ALUMINA CERAMIC | ALUMINA CERAMIC | ONLY PRESS, NO IRREGULARITY PROCESSING | ABOUT 120° | SMALL | RELATIVELY LOW COST |
| TYPE B: FROST GLASS (BOTH SURFACES) + MIRROR | TRANSPARENT GLASS + MIRROR | BOTH SURFACES, REFLECTING SURFACE IRREGULARITY PROCESSING (SANDBLASTING and/or ETCHING, ETC.) | FOCUSING ANGLE (ABOUT 14°) + EFFECT OF INCREASE OF FOCUSING ANGLE (ABOUT 30°) = ABOUT 44° | SMALL | HIGH COST |
| TYPE C: METAL + SURFACE IRREGULARITY PROCESSING | METAL | REFLECTING SURFACE IRREGULARITY PROCESSING (SANDBLASTING and/or ETCHING, ETC.) | ABOUT 40° | MEDIUM | RELATIVELY LOW COST |
| TYPE D: FROST GLASS (ONE-SIDE SURFACE) + MIRROR | TRANSPARENT GLASS + MIRROR | ONE-SIDE SURFACE, REFLECTING SURFACE IRREGULARITY PROCESSING (SANDBLASTING and/or ETCHING, ETC.) | FOCUSING ANGLE (ABOUT 14°) + EFFECT OF INCREASE OF FOCUSING ANGLE (ABOUT 6°) = ABOUT 20° | LARGE | HIGH COST |

PROJECTOR

TECHNICAL FIELD

The present invention relates to a projector using a laser light source.

BACKGROUND ART

As a background art of a projector using a laser as a light source, there is Patent Document 1. Patent Document 1 discloses a projector that uses white light generated by using blue light from a laser light source and yellow fluorescence including red light and green light for image display, requires two blue laser light sources, uses a dichroic mirror that reflects the blue light from a first blue laser light source and transmits the yellow fluorescence emitted from a fluorescent plate by using the light from a second blue laser light source as excitation light, and combines the blue light and the yellow fluorescence to generate white light.

CITATION LIST

Patent Document

Patent Document 1: JP 2017-15966 A

SUMMARY OF THE INVENTION

Problems to be Solved by the Invention

In Patent Document 1, it is necessary to arrange blue lasers at two different positions, and the problem that the cost is high and the light source apparatus is large is not considered.

An object of the present invention is to provide a projector that more appropriately generates white light from a laser light source.

Solutions to Problems

The present invention has been made in view of the background art and the problems described above, and as an example, there is provided a projector including: a white light generator that uses a blue laser as a light source to generate blue light and yellow light based on the blue laser and generates white light including the generated blue light and yellow light; and an optical system that modulates light based on the white light generated by the white light generator with an image display element and projects the modulated light, wherein the white light generator is configured to include: a dichroic mirror that is irradiated with the blue light from the blue laser as the light source; a first condenser lens that focuses blue light being reflected by or passing through the dichroic mirror; a diffusion plate that diffuses the blue light focused by the first condenser lens; a second condenser lens that focuses the blue light passing through or being reflected by the dichroic mirror; a phosphor that is irradiated with the blue light focused by the second condenser lens to emit yellow light, wherein the diffusion plate is an alumina ceramic plate, wherein the dichroic mirror has a first region having a characteristic of transmitting one of the blue light and the yellow light and reflecting the other and a second region having a characteristic of reflecting or transmitting both the blue light and the yellow light, wherein the blue light included in the white light output by the white light generator is obtained by allowing the blue light diffused by the diffusion plate to pass through the first condenser lens and performing reflection or transmission of the dichroic mirror, and wherein the yellow light included in the white light output by the white light generator is obtained by allowing the yellow light emitted from the phosphor to pass through the second condenser lens and performing reflection or transmission of the dichroic mirror.

Effects of the Invention

According to the present invention, it is possible to provide a projector that more appropriately generates white light from a laser light source and to use the projector for image display.

BRIEF DESCRIPTION OF THE DRAWINGS

FIG. 2A is a configuration diagram of a light source apparatus and a diagram illustrating transmission/reflection characteristics of a dichroic mirror according to the first embodiment.

FIG. 3 is a diagram illustrating the principle of increasing a B light utilization rate by division of transmission and reflection regions of the dichroic mirror according to the first embodiment.

FIG. 23 is a type comparison table of the diffusion plate according to the seventh embodiment.

MODE FOR CARRYING OUT THE INVENTION

Hereinafter, embodiments according to the present invention will be described with reference to the drawings.

First Embodiment

Figure 1:
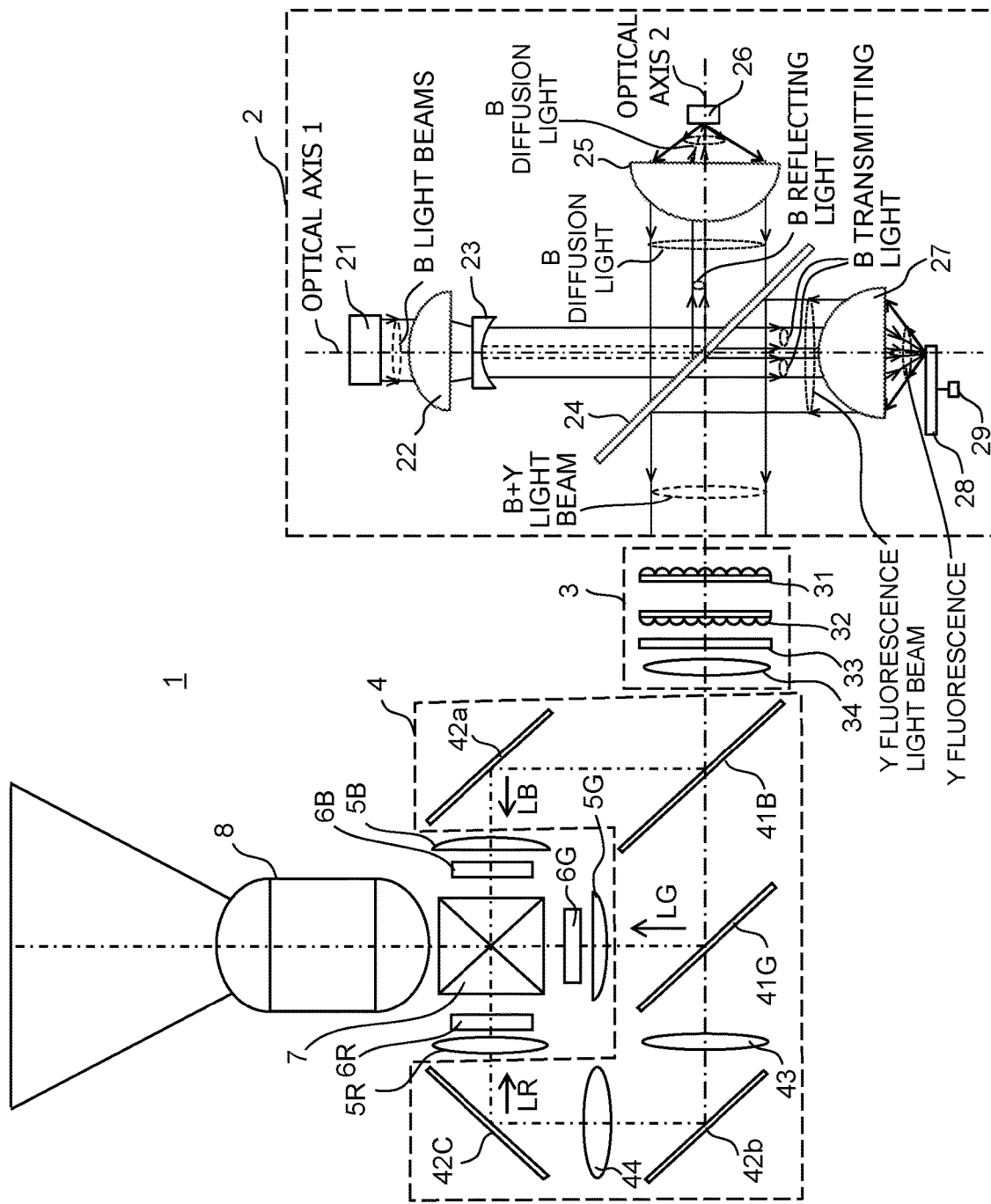
FIG. 1 is a configuration diagram illustrating an optical system of a projector according to a first embodiment.

FIG. 1 is a configuration diagram illustrating an optical system of a projector according to the present embodiment. In FIG. 1, an optical system 1 of the projector mainly includes a light source apparatus 2, an illumination optical system 3, a color separating optical system 4, image display elements 6R, 6G, and 6B, a light combining optical system 7 as a combining optical system, and a projection lens 8 as a projection optical system.

The overall operations of the optical system of the projector will be described with reference to FIG. 1. The light source apparatus 2 will be described later, but from the light source apparatus 2, it is possible to obtain light beams of white light W (in addition, the white light is also referred to as "W light") which is B+Y light in which blue light B (light in a blue band, hereinafter also referred to as "B light") and fluorescence Y (hereinafter, also referred to as yellow light "Y light") are added. Herein, the fluorescence Y is yellow fluorescence that also includes light in a green band and light in a red band. The light beams of the white light W are divided into a plurality of lights by a plurality of lens cells of a multi-lens 31 of the illumination optical system 3 and are efficiently guided to a second multi-lens 32 and a polarization conversion element 33. Then, the light is polarized in a predetermined polarization direction by the polarization conversion element 33. The polarized light is focused by a light focusing lens 34 and incident on the color separating optical system 4.

In the color separating optical system 4, first, the dichroic mirror 41B is irradiated with blue light B, the blue light B (light in a blue band) in the irradiated white light W is reflected, and green light G (light in a green band, hereinafter also referred to as "G light") and red light R (light in a red band, hereinafter also referred to as "R light") are allowed to pass. The reflected B light is reflected by a reflection mirror 42A, is allowed to pass through a condenser lens 5B, and is incident on the image display element 6B. On the other hand, with respect to the G light and the R light passing through a dichroic mirror 41B, the G light is reflected by and the R light is allowed to pass through a dichroic mirror 41G. The reflected G light is allowed to pass through a condenser lens 5G and is incident on the image display element 6G. In addition, the R light passing through the dichroic mirror 41G is focused by a relay lens 43 and then reflected by a reflection mirror 42B. The reflected R light is focused again by a relay lens 44 and is reflected by a reflection mirror 42C. The reflected R light is further focused by a relay lens 5R and is incident on the image display element 6R. Each image display element forms an image by modulating the light intensity for each pixel in response to an image signal (not illustrated) with respect to the incoming light and generates outgoing light by reflection or transmission. In addition, the example of FIG. 1 discloses an example of a transmission type image display element. The B light, the G light, and the R light emitted from the respective image display elements are combined into color image light by the light combining optical system 7 and reach a screen (not illustrated) after passing through the projection lens 8. That is, the optical image formed by the image display element is expanded and projected on the screen (not illustrated).

Next, referring to FIG. 2A, detailed description of the light source apparatus 2 in the present embodiment will be made. FIG. 2A illustrates a conceptual diagram illustrating transmission/reflection characteristics of a dichroic mirror 24 at a position corresponding to the optical axis 1 by extracting a portion of the light source apparatus 2 of FIG. 1. In FIG. 2A, a light source 21 is a blue laser (BL), and blue laser light (B light) is emitted by setting the optical axis 1 as a center. Then, the B light beam is focused and allowed to overlap by the lens 22, and the B light beam becomes a parallel light beam by the lens 23. Then, the dichroic mirror 24 is irradiated with the B light beam.

Herein, the dichroic mirror 24 has a region having the characteristics of the B transmitting/Y reflecting as illustrated and has a totally reflecting region at the central portion of the dichroic mirror. That is, the dichroic mirror has a wide-area of the characteristics of the B light transmission/Y light reflection. However, the dichroic mirror 24 has a region of the totally reflecting characteristic partially different from the characteristic of the B light transmission/Y light reflection. In the following description of the present invention, among the regions provided in the dichroic mirror of which transmission/reflection characteristics are divided into regions, a region having a characteristic of occupying a wide-area is hereinafter referred to as a "wide-area characteristic region". In addition, in a partially narrow region, a region having a characteristic different from that of the "wide-area characteristic region" is hereinafter referred to as a "different characteristic region". In the example of FIG. 2A, the region having the characteristics of the B transmitting/Y reflecting is a "wide-area characteristic region", and the totally reflecting region is a "different characteristic region". In addition, the B light transmission/reflection characteristics in the "wide-area characteristic region" may be completely uniform. However, in order to eliminate color unevenness depending on the incident angles of the right light and the left light, a cut wavelength (for example, 50% wavelength) of the dichroic coat may be inclined in the left and right directions. In this case, in the description of each embodiment of the present invention, even if the cut wavelength is inclined, it is considered that the cut wavelength is included in the same "wide-area characteristic region". In addition, in the description of each embodiment of the present invention, the "different characteristic region" describes an example having a totally reflecting characteristic or a totally transmitting characteristic, but the dichroic coat is likely to be used for any reason as long as the influence on the present invention is small. Even in this case, the transmission/reflection characteristics may be completely uniform within the "different characteristic region". However, in order to eliminate the color unevenness depending on the incident angles of the right light and the left light, the cut wavelength (for example, 50% wavelength) may be set to be inclined in the left and right directions. Even in this case, although if the inclination of the cut wavelength is set, it is considered that the cut wavelength is included in the same "different characteristic region".

For example, as an example, when a case will be described in which the ratio of the totally reflecting region which is a different characteristic region in the B light region irradiated from the light source 21 to the dichroic mirror is set to about 20% of the irradiation range of the incoming light beam, about 20% of the B light beam irradiated to the dichroic mirror 24 is reflected, and about 80% is allowed to pass. That is, in the B light beam irradiated from the light source 21 to the dichroic mirror 24, about 20% of the B light beam central portion is reflected.

The B light beam reflected by the dichroic mirror 24 is focused by the condenser lens 25 and is irradiated to a diffusion plate 26. Then, the B light beam diffused by the diffusion plate 26 by setting the optical axis 2 which is an optical axis of the condenser lens 25 as a center is allowed to pass through the condenser lens 25 and is irradiated to the dichroic mirror 24. At this time, the area of the B light beam irradiated to the dichroic mirror 24 is larger than the area of the B light beam irradiated to the dichroic mirror 24 from the light source 21. Then, in a case where the area expansion rate of the B light beam irradiated from the diffusion plate 26 to the dichroic mirror 24, for example, the diffusion plate 26 having the area expansion rate of the B light incident region by the diffusion plate, as an example, is 2, of the B light beam irradiated from the diffusion plate 26 to the dichroic mirror 24, for example, about 10% is reflected by the shape of the different characteristic region, but about 90% light can be allowed to pass.

On the other hand, in the B light beam irradiated from the light source 21 to the dichroic mirror 24, the B light beam passing through the dichroic mirror 24 is focused by the condenser lens 27 and irradiated to the phosphor wheel 28. The phosphor wheel 28 is coated with a phosphor that emits Y light by setting the B light as the excitation light, and the phosphor wheel is rotated by a motor 29 to prevent burning. Then, by setting the optical axis 1 as a center, the Y light is emitted from the phosphor wheel 28, passes through the condenser lens 27, and is irradiated to the dichroic mirror 24. Then, the Y light beam is reflected by the dichroic mirror 24 and overlaps with the B light beam to be a W light beam which is a B+Y light beam.

Figure 2B:
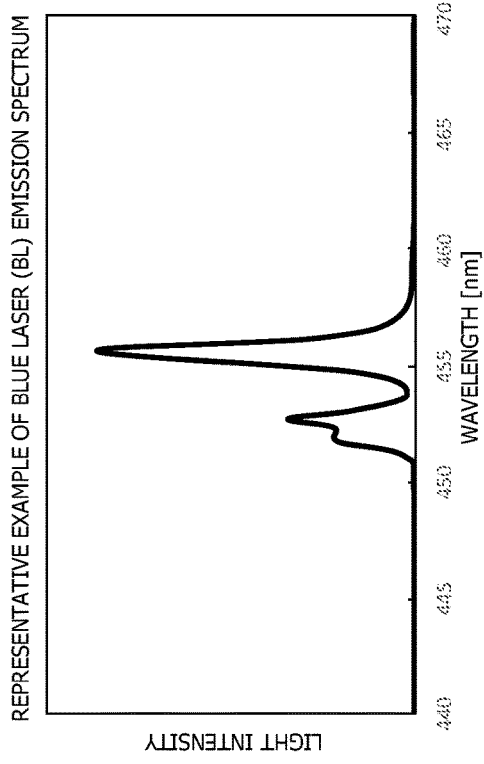
FIG. 2B is an example of an emission spectrum of a blue laser according to the first embodiment.
Figure 2C:
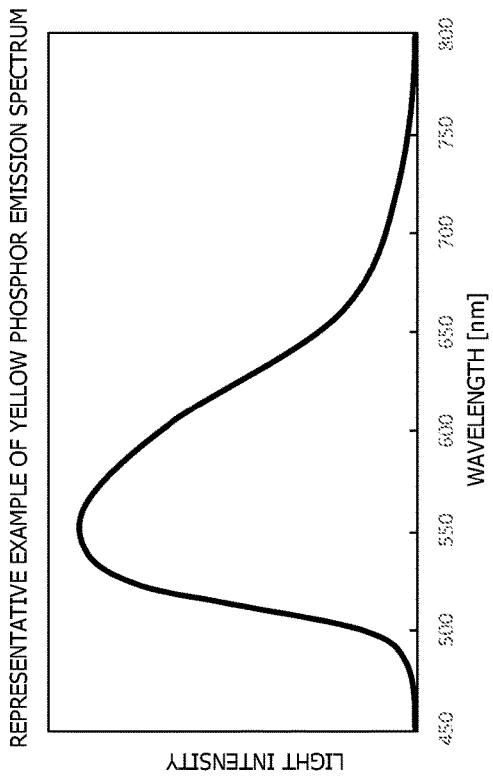
FIG. 2C is an example of an emission spectrum of a yellow phosphor according to the first embodiment.

In addition, is FIG. 2B, is illustrated an example of the emission spectrum of the blue laser according to the present embodiment. In addition, in FIG. 2C, is illustrated an example of the emission spectrum of the yellow phosphor according to the present invention.

As described above, the light source apparatus 2 according to the present embodiment uses the blue laser as the light source 21 and combines B (blue)+Y (yellow) light to generate white light W. That is, the light source apparatus 2 can also be referred to be a white light generator. In addition, the dichroic mirror 24 has a region of characteristic B transmitting/Y reflecting as a wide-area characteristic region, and has a totally reflecting region as a different characteristic region in the central portion of the dichroic mirror. Then, the B light is diffused by the diffusion plate 26 to expand the area of the B light. Accordingly, it is possible to reduce the area ratio of the return light of the B light, which is light not included in the white light W, to the light source 21, so that it is possible to increase the B light utilization rate.

Figure 4:
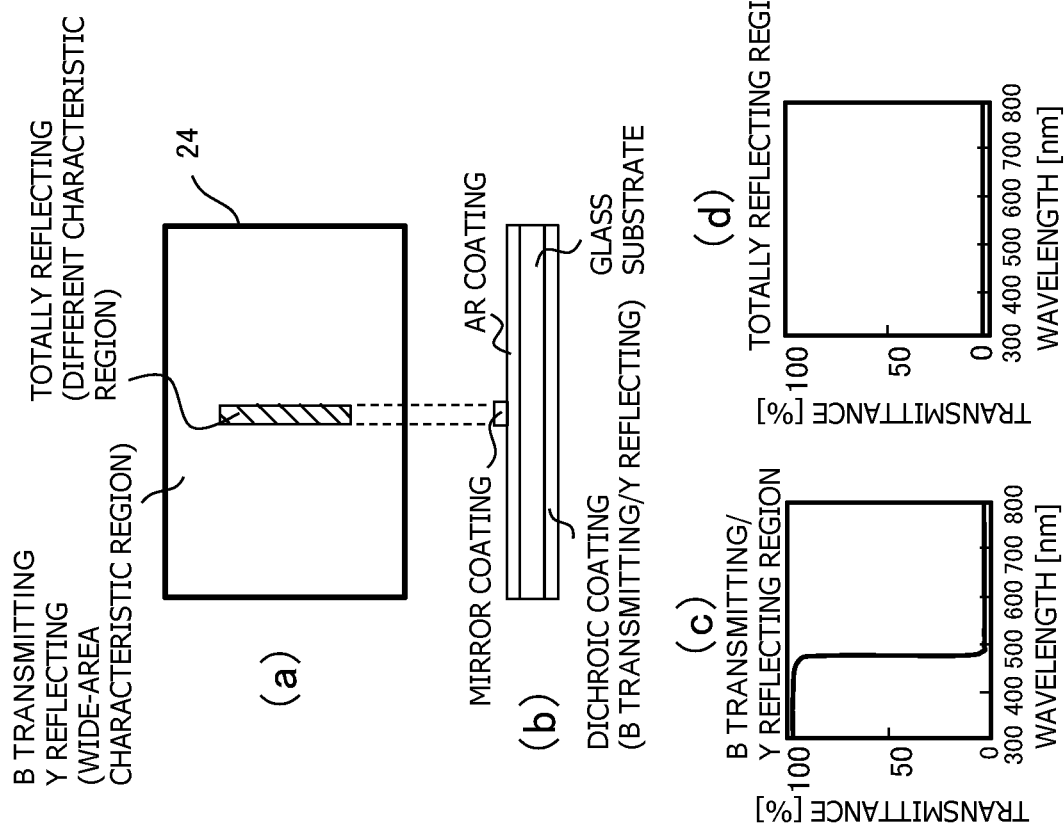
FIG. 4 is a diagram illustrating a method of coating a B transmitting/Y reflecting region and a totally reflecting region of the dichroic mirror according to the first embodiment and a transmittance characteristic of each region.

Next, an example of a method of coating the B transmitting/Y reflecting region which is a wide-area characteristic region and the totally reflecting region which is a different characteristic region of the dichroic mirror 24 in the present embodiment and an example of the transmittance characteristic of each region will be described with reference to FIG. 4. FIG. 4(a) is a plan view, FIG. 4(b) is a cross-sectional view, FIG. 4(c) is a transmittance characteristic of the B transmitting/Y reflecting region, and FIG. 4(d) is a transmittance characteristic of the totally reflecting region. As illustrated in FIG. 4(b), the dichroic mirror 24 can be manufactured by applying dichroic coating having a B transmitting/Y reflecting characteristic on one surface of a glass substrate, applying antireflection coating (AR coating) on the opposite surface, and applying mirror coating for the totally reflecting region thereon. As illustrated in FIG. 4(c), in the B transmitting/Y reflecting region which is a wide-area characteristic region, the transmittance around 455 nm which is a wavelength of the B light is at least 95% or more and is preferably as close as possible to 100%, and the transmittance of light from the green band to red band around 500 to 700 nm included in the Y light is to at least 5% or less and is preferably as close as possible to 0%. In addition, as illustrated in FIG. 4D, the transmittance of the totally reflecting region which is a different characteristic region is at least 5% or less in the total wavelength region and is preferably as close as possible to 0%.

That is, in each embodiment of the present invention, the B light transmission/Y light reflection characteristic denotes that the transmittance for around 455 nm which is a wavelength of the B light is at least 95% or more, and the reflectance for the light around 500 to 700 nm which is light from the green band to the red band is at least 95% or more. Similarly, in each embodiment of the present invention, the B light reflection/Y light transmission characteristic denotes that the reflectance for around 455 nm which is a wavelength of the B light is at least 95% or more, and the transmittance for the light around 500 to 700 nm which is light from the green band to the red band is at least 95% or more.

In addition, in each embodiment of the present invention, the "totally transmitting characteristic" denotes that the transmittance in the total wavelength region from at least around 455 nm which is a blue band to 700 nm which is a red band is at least 95% or more. Similarly, in each of the embodiments of the present invention, the "totally reflecting characteristic" denotes that the reflectance in the total wavelength region from at least around 455 nm which is a blue band to 700 nm which is a red band is at least 95% or more.

In addition, in the following description, when the calculation of the light utilization rate or the like is to be performed, in order to simplify the calculation, in the case of the characteristic of reflecting the light in a predetermined band, the calculation is performed with 100% reflection, and in the case of the characteristic of transmitting the light in a predetermined band, the calculation is performed with 100% transmission.

In addition, in each embodiment of the present invention, in the "wide-area characteristic region", the transmission characteristics and the reflection characteristics of the B light and the Y light are configured to be opposite to each other. That is, in a case where there is a characteristic of the B light transmission in the "wide-area characteristic region", the Y light is configured to have a reflection characteristic, so that the characteristic of the "wide-area characteristic region" is set as the B light transmission/Y light reflection characteristic. In addition, in a case where there is a characteristic of the B light reflection in the "wide-area characteristic region", the Y light is configured to have a transmission characteristic, so that the characteristic of the "wide-area characteristic region" is set as the B light reflection/Y light transmission characteristic.

In addition, in each embodiment of the present invention, in the "different characteristic region", the transmission characteristics and the reflection characteristics of the B light and the Y light are configured to be the same. That is, in a case where there is a characteristic of the B light transmission in the "different characteristic region", the Y light is also configured to have a transmission characteristic, so that the characteristic of the "different characteristic region" is set as the totally transmitting characteristic. In addition, in a case where there is a characteristic of the B light transmission in the "different characteristic region", the Y light is also configured to have a reflection characteristic, so that the characteristic of the "different characteristic region" is set as the totally reflecting characteristic.

Next, the principle of increasing the B light utilization rate by the configuration according to the present embodiment will be described with reference to FIG. 3. FIG. 3(a) is a case where the configuration (the region division of transmission/reflection characteristics and the diffusion plate) according to the present embodiment is not employed, and FIG. 3(b) is an example of an optical system of the light source apparatus in which there are the region division of transmission/reflection characteristics and the diffusion plate according to the present embodiment.

In the configuration of FIG. 3(a), it is assumed that the transmission/reflection characteristics of the dichroic mirror 24 are uniform over the total region, the B light reflectance is R1, and the B light transmittance is T1. In this case, the B light utilization rate E1 which is a ratio of the B outgoing light (B transmission light in the drawing) to the incoming light of the B light is R1×(1−R1)=(R1×T1). For example, if it is assumed that R1=0.2 and T1=0.8 which are settings where 20% of the B light incident on the dichroic mirror 24 is reflected and 80% is allowed to pass, the B light utilization rate E1 [%]=0.2×(1−0.2)×100=16 [%].

On the other hand, in the case of the configuration of FIG. 3(b) according to the present embodiment, as illustrated in FIG. 3(c), the area of the incident region I of the B incoming light is represented by SI, the area of the incident region O of the B diffusion light is represented by SO, the area of the totally reflecting region WI (the reflection characteristic R of the B light becomes R1) which is a different characteristic region in the incident region I of the B incoming light is represented by SWI, and the area of the totally reflecting region WO (the reflection characteristic R of the B light R≈1) which is a different characteristic region in the incident region O of the B incoming light is represented by SWO. At this time, the B incoming light substantial reflectance R2 at the dichroic mirror 24, which is a ratio of reflection light to the B incoming light from the laser light source, can be calculated from SWI/SI. In addition, the B diffusion light substantial transmittance T2 which is a ratio of transmission to the B diffusion light can be calculated from (SO−SWO)/SO by the dichroic mirror 24. The B light utilization rate E2 is R2×T2=(SWI/SI)×((SO−SWO)/SO). Herein, SWI/SI can also be represented as the use efficiency of the B light incident on the dichroic mirror from the laser light source. In addition, (SO−SWO)/SO can be represented as the use efficiency of the B light incident on the dichroic mirror from the B diffusion light.

Herein, in order to compare the efficiencies of the configuration of FIG. 3(a) and the configuration of FIG. 3(b), considered is the case where the settings of the B light reflectance R1 in FIG. 3(a) and the B incoming light substantial reflectance R2 in FIG. 3(b) are allowed to be equal to each other. At this time, the condition for E2>E1 is R2×T2>R1×(1−R1). Herein, when R2 is substituted for R1, R2×T2>R2×(1−R2). When both sides are divided by R2, T2>1−R2. This can be converted into (SO−SWO)/SO>(SI−SWI)/SI. By multiplying both sides by SO, SO−SWO>(SI−SWI)×SO/SI. If SO/SI is set to α as the area expansion rate of the incident region of the diffusion light, SO−SWO>SO−SWI×α, and thus, this can be modified to SWI×α>SWO. This can be modified to SWO/SWI<α, and if SWO/SWI=β, α<β. This expression denotes that, by setting the shape of the different characteristic region in the dichroic mirror 24 so that the ratio β of SWO which is a size of the different characteristic region in the incident region O of the B diffusion light to SWI which is a size of the different characteristic region in the incident region I of the B incoming light is not to be larger than the area expansion rate α of the incident region of the diffusion light, the efficiency of the configuration of FIG. 3(b) can be allowed to be larger than the efficiency of the configuration of FIG. 3(a). When the B light utilization rate E2 is represented by an equation using α and β, E2=R2×T2=R2×(1−(R2×β/α)). That is, in the configuration of FIG. 3(b) according to the present embodiment, if only the B light utilization rate up to the emission of the dichroic mirror 24 is considered, the larger the area expansion rate α of the incident region of the diffusion light is, the higher the efficiency is. The smaller the ratio β of the SWO which is a size of the different characteristic region in the incident region O of the B diffusion light to the SWI which is a size of the different characteristic region in the incident region I, the higher the efficiency is.

Specifically, for example, in a case where R2=SWI/SI=0.2, the area expansion rate of the incident region of the diffusion light α=SO/SI=2, and the shape of the different characteristic region is β=SWO/SWI=1.2, the B light utilization rate E2 [%]=0.2×(1−(0.2×1.2/2))×100=17.2 [%], which is larger.

This is larger than the B light utilization rate E1 [%]=16 [%] of the configuration of FIG. 3(a) in a case where R1=0.2.

As described above, according to the present embodiment, in the light source apparatus that generates white light by using a blue laser as the light source 21 and combining B+Y light, in such a configuration where the dichroic mirror 24 has a characteristic region of B transmitting/Y reflecting which is a wide-area characteristic region and a totally reflecting region which is a different characteristic region provided at the central portion, so that the transmission/reflection characteristics are divided into regions, it is possible to increase the B light utilization rate by diffusing the B light by the diffusion plate 26 and expanding the area of the B light.

As described above, according to the present embodiment, it is possible to more appropriately realize a projector that generates white light from a laser light source and that is used for image display.

Second Embodiment

The present embodiment is an example in which the specifications of the coating of the dichroic mirror of the light source apparatus in the projector of the first embodiment are changed, and accordingly, the arrangement of the phosphor wheel and the diffusion plate is changed.

In addition, for simplifying the description, in the description of the present embodiment, only the points changed from the first embodiment will be described, and the configurations and operations that are not particularly described are the same as those of the first embodiment. In particular, since the configurations and operations of the optical system and the image display element of the projector after generation of the white light, W light, which is B+Y light in the light source apparatus are the same as those in FIG. 1 of the first embodiment, and thus, the description thereof will be omitted.

Figure 5:
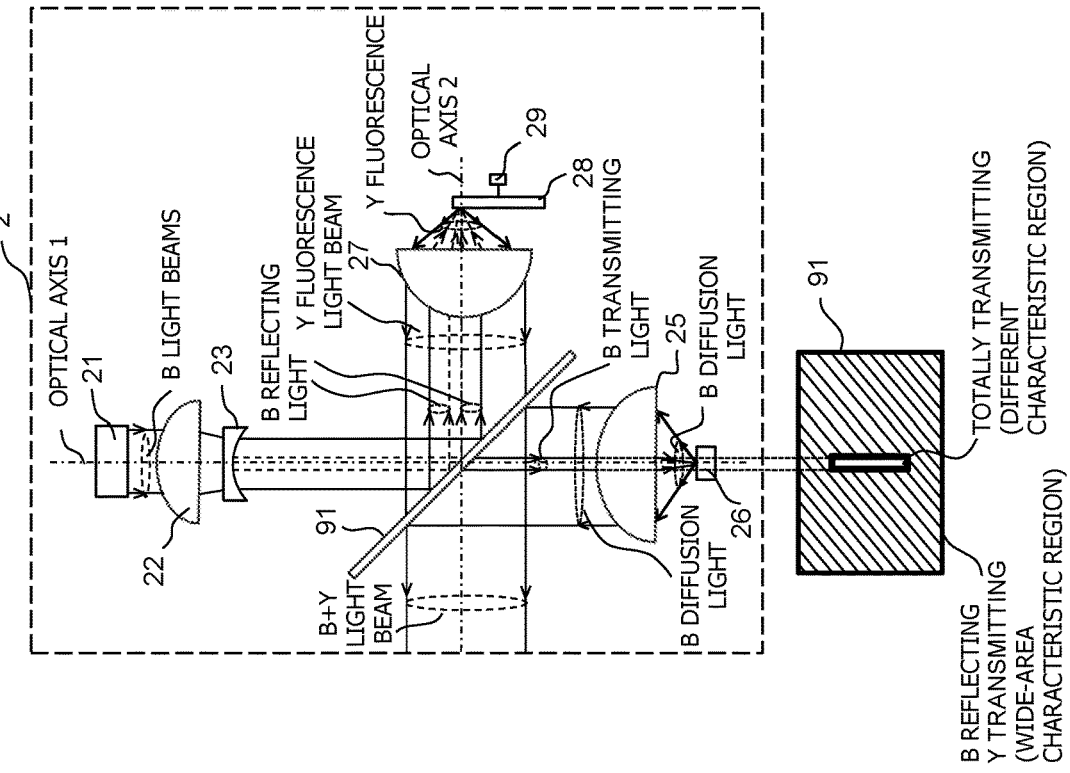
FIG. 5 is a configuration diagram of a light source apparatus and a diagram illustrating transmission/reflection characteristics of a dichroic mirror according to a second embodiment.

FIG. 5 is a configuration diagram of the light source apparatus of the projector and a diagram illustrating the transmission/reflection characteristics of the dichroic mirror in the present embodiment. In FIG. 5, components having the same functions as those in FIG. 2 are denoted by the same reference numerals, and thus, the description thereof will be omitted. FIG. 5 is different from FIG. 2 in that the transmission/reflection characteristics of the dichroic mirror are different and that the positions of the phosphor wheel and the diffusion plate are interchanged.

In FIG. 5, the dichroic mirror 91 is irradiated with the B light beam that has been made substantially parallel by the lens 23. Herein, as illustrated, the dichroic mirror 91 has a characteristic region of the B reflecting/Y transmitting which is a wide-area characteristic region and has a totally transmitting region which is a different characteristic region in the central portion of the dichroic mirror. That is, the dichroic mirror 91 has a wide region of characteristics of the B light reflection/Y light transmission which is a wide-area characteristic region, but has a region (different characteristic region) of totally transmitting characteristic partially different from the characteristic of the B light reflection/Y light transmission. For example, as an example, when a case will be described in which the ratio of the totally transmitting region to the B light region irradiated from the light source 21 to the dichroic mirror is set to 20% of the total region, about 80% of the B light beam irradiated to the dichroic mirror 91 is reflected, and about 20% is allowed to pass. That is, about 20% of the B light beam central portion of the B light beam irradiated from the light source 21 to the dichroic mirror 91 is transmitted. As described above, the transmission/reflection characteristics of the dichroic mirror of the second embodiment are different from those of the first embodiment, but the concept is common in that the same dichroic mirror has the wide characteristic region having a predetermined transmission/reflection characteristic region and the different characteristic region partially different from the predetermined transmission/reflection characteristic.

The B light beam reflected by the dichroic mirror 91 is focused by the condenser lens 27 and is irradiated to the phosphor wheel 28. By setting the optical axis 2 which is an optical axis of the condenser lens 27 as a center, the Y light is emitted from the phosphor wheel 28, allowed to pass through the condenser lens 27, and is irradiated to the dichroic mirror 91, and the Y light beam is allowed to pass through the dichroic mirror 91.

On the other hand, in the B light beams irradiated from the light source 21 to the dichroic mirror 91, the B light beam passing through the dichroic mirror 91 is focused by the condenser lens 25 and is irradiated to the diffusion plate 26. By setting the optical axis 1 as a center, the B light beam diffused by the diffusion plate 26 is allowed to pass through the condenser lens 25 and is irradiated to the dichroic mirror 91. At this time, the area of the B light beam irradiated to the dichroic mirror 91 is larger than the area of the B light beam irradiated to the dichroic mirror 91 from the light source 21. In a case where the area expansion rate of the B light incident region by the diffusion plate in the B light beam irradiated from the diffusion plate 26 to the dichroic mirror 91 is, for example, 2, as an example, about 10% is allowed to pass due to the shape of the different characteristic region, but about 90% can be reflected. Then, the B light beam reflected by the dichroic mirror 91 overlaps with the Y light beam to be a B+Y light beam. Therefore, even with the configuration of the second embodiment, the B light utilization rate can be increased to the same extent as the first embodiment.

Figure 6:
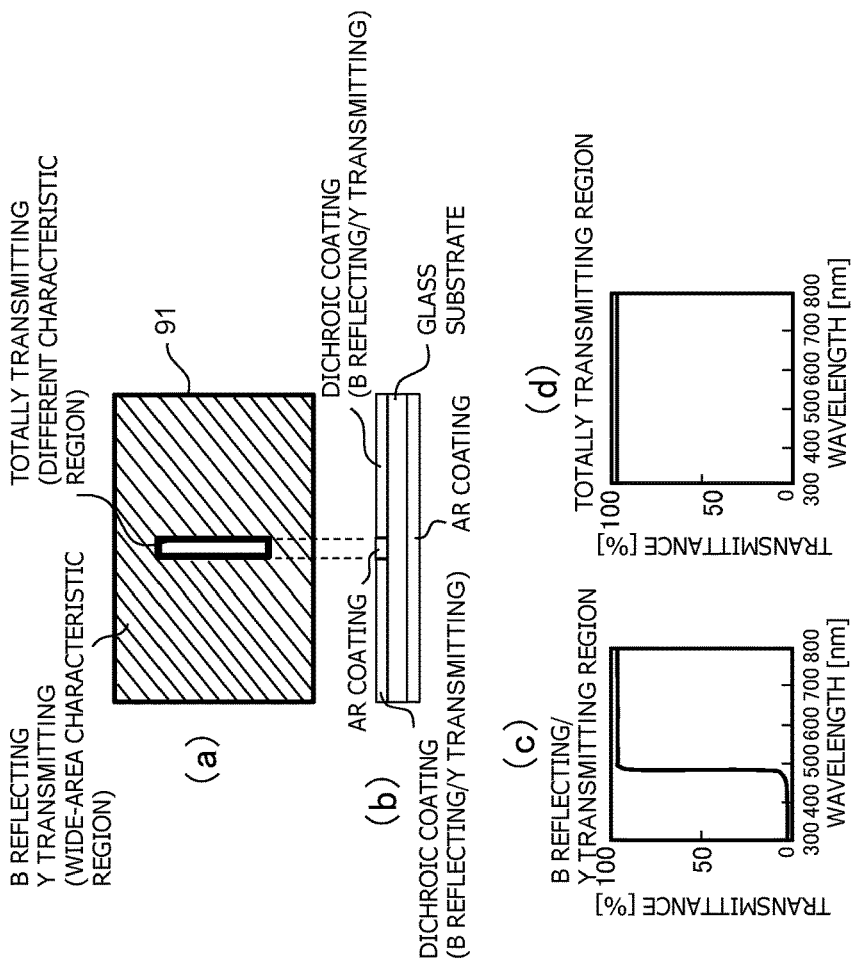
FIG. 6 is a diagram illustrating a method of coating a B reflecting/Y transmitting region and a totally transmitting region of the dichroic mirror according to the second embodiment and a transmittance characteristic of each region.

FIG. 6 is a diagram illustrating a method of coating the B reflecting/Y transmitting region and the totally transmitting region of the dichroic mirror 91 in the present embodiment and a transmittance characteristic of each region. FIG. 6(a) is a plan view, FIG. 6(b) is a cross-sectional view, FIG. 6(c) is a transmittance characteristic of the B reflecting/Y transmitting region, and FIG. 6(d) is a transmittance characteristic of the totally transmitting region. As illustrated in FIG. 6(b), the dichroic mirror 91 can be manufactured by applying AR coating on one surface of a glass substrate and applying dichroic coating having B reflecting and Y transmitting characteristics, and AR coating for the totally transmitting region on the opposite surface. As illustrated in FIG. 6(c), in the B reflecting/Y transmitting region, which is a wide-area characteristic region, the transmittance around 455 nm which is a wavelength of the B light is at least 5% or less and is preferably as close as possible to 0%, and the transmittance of light from the green band to the red band around 500 to 700 nm included in the Y light is at least 95% or more and is preferably as close as possible to 100%. In addition, as illustrated in FIG. 6(d), the transmittance of the totally transmitting region, which is a region of different characteristics, is at least 95% or more in the total wavelength range and is preferably as close as possible to 100%.

In addition, details of the principle and conditions of increasing the B light utilization rate in the configuration of the present embodiment may be obtained from the description of FIG. 3 of the first embodiment by replacing the "transmission" of the B light with "reflection" and replacing the "totally reflecting" with "totally transmitting". Specifically, the area of the incident region I of the B incoming light in FIG. 3(c) is represented by SI, the area of the incident region O of the B diffusion light is represented by SO, the area of the totally transmitting region WI (the transmission characteristic T of the B light is T≈1) which is a different characteristic region in the incident region I of the B incoming light is represented by SWI, and the area of the totally transmitting region WO (the reflection characteristic T of the B light is T≈1) which is a different characteristic region in the incident region O of the B diffusion light is represented by SWO. At this time, the B incoming light substantial transmittance T3 which is a ratio of the transmission light to the B incoming light from the laser light source can be calculated from SWI/SI by the dichroic mirror 91. In addition, the B diffusion light substantial reflectance R3 which is a ratio of transmission to the B diffusion light can be calculated from (SO−SWO)/SO by the dichroic mirror 91. The B light utilization rate E3 in the light source apparatus according to the second embodiment is T3×R3= (SWI/SI)×((SO−SWO)/SO). In other words, even if the reflection characteristic and the transmission characteristic of the B light are opposite to those of the first embodiment, the B light utilization rate E3 of the light source apparatus is not changed from the product of the use efficiency (SWI/SI) of the B light incident on the dichroic mirror from the laser light source and the use efficiency ((SO−SWO)/SO) of the B light incident on the dichroic mirror from the B diffusion light.

Then, similarly to the equation modified example of the embodiment 1E2, by changing the SO/SI by using the area expansion rate α of the incident region of the diffusion light and the ratio β of SWO which is a size of the different characteristic region in the incident region O of the B diffusion light to SWI which is a size of the different characteristic region in the incident region I of the B incoming light, the B light utilization rate E3 of the light source apparatus of the present embodiment can also be expressed as E3=T3×R3=T3×(1−(T3×β/α)).

That is, in the configuration according to the present embodiment as well, if only the B light utilization rate up to the emission of the dichroic mirror 91 is considered, the larger the area expansion rate α of the incident region of the diffusion light is, the higher the efficiency is. The smaller the ratio β of the SWO which is a size of the different characteristic region in the incident region O of the B diffusion light to the SWI which is a size of the different characteristic region in the incident region I, the higher the efficiency is.

As described above, according to the present embodiment, in the light source apparatus that generates white light by using a blue laser as the light source 21 and combining B+Y light, in such a configuration where the dichroic mirror 24 has a characteristic region of B reflecting/Y transmitting which is a wide-area characteristic region and a totally transmitting region which is a different characteristic region provided at the central portion, so that the transmission/reflection characteristics are divided into regions, it is possible to increase the B light utilization rate by diffusing the B light by the diffusion plate 26 and expanding the area of the B light As described above, according to the present embodiment, even with a configuration different from that of the first embodiment, it is possible to realize a projector that more appropriately generates white light from a laser light source and that is used for image display to the same degree as the first embodiment.

Third Embodiment

The present embodiment describes an example in which, in the projector according to the first embodiment, the different characteristic region in the dichroic mirror in the light source apparatus is arranged at a position offset from a central portion where the optical axis 2 which is an optical axis of the condenser lens 25 and the dichroic mirror are in contact with each other.

Figure 7:
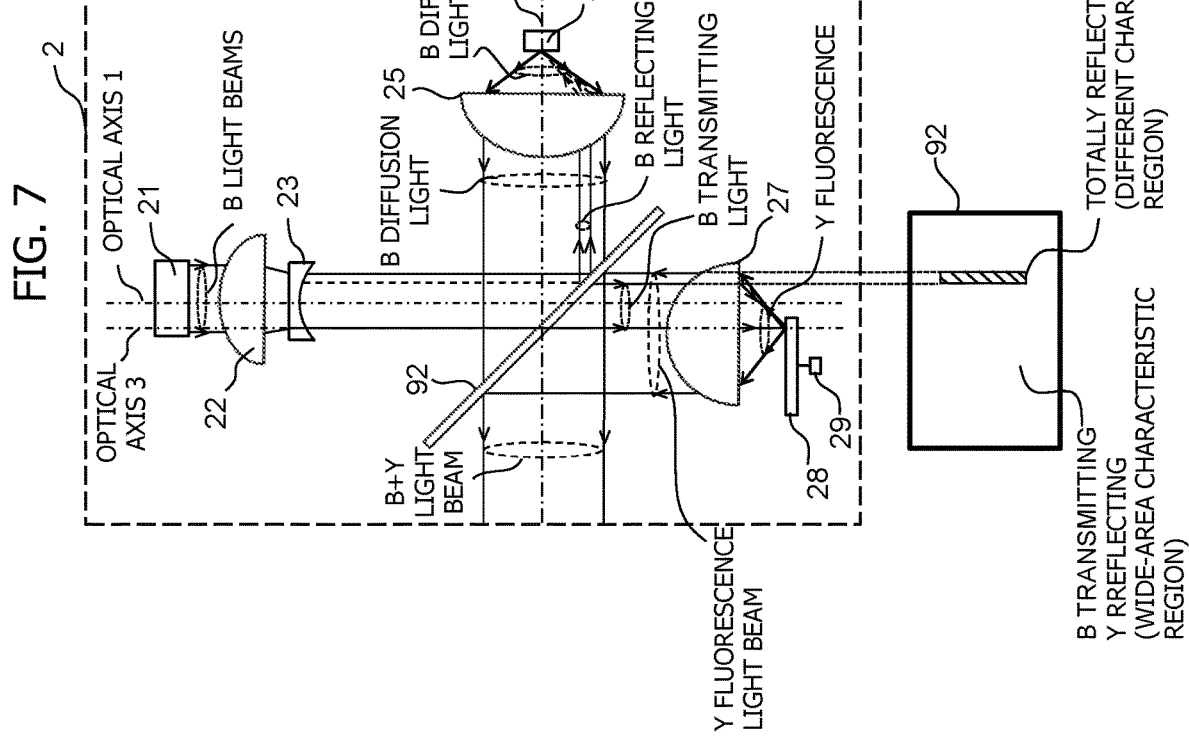
FIG. 7 is a configuration diagram of a light source apparatus and a diagram illustrating transmission/reflection characteristics of a dichroic mirror according to a third embodiment.

FIG. 7 is a configuration diagram of the light source apparatus and a diagram illustrating transmission/reflection characteristics of the dichroic mirror according to the present embodiment. In FIG. 7, components having the same functions as those in FIG. 2 are denoted by the same reference numerals, and thus, the description thereof will be omitted.

In FIG. 2 of the first embodiment, the position of the different characteristic region in the dichroic mirror is arranged near the central portion where the optical axis 2 and the dichroic mirror are in contact with each other, and in contrast, in FIG. 7 of the present invention, the position of the different characteristic region is located at the position offset from the central portion where the optical axis 2 and the dichroic mirror are in contact with each other.

In order to change the position of the different characteristic region offset from the central portion where the optical axis 2 and the dichroic mirror are in contact with each other in this manner, simply, within the range where the B light incoming light from the B color laser light source 21 is incident, the different characteristic region may be arranged at a position offset from the central portion where the optical axis 2 and the dichroic mirror are in contact with each other. In addition, by arranging the optical axis 1 of the B color laser light source 21 to be offset from the optical axis 3 having a mirror arrangement with respect to the optical axis 2 of the condenser lens 25 and the dichroic mirror, t the different characteristic region can be arranged to be further offset from the optical axis 2. In FIG. 7, illustrated is an example in which both the offset of the optical axis 1 of the laser light source 21 and the offset from the central portion of the different characteristic region are employed.

In FIG. 7, the B light beam allowed to be parallel by the lens 23 is irradiated to the dichroic mirror 92. Herein, as illustrated, the dichroic mirror 92 has a B transmitting/Y reflecting characteristic region, which is a wide-area characteristic region, and is prepared for a position offset from the position where the totally reflecting region, which is a different characteristic region, is in contact with the optical axis 2. For example, when the ratio of the totally reflecting region to the B light region irradiated from the light source 21 to the dichroic mirror is set to 20% of the total, about 20% of the B light beam irradiated to the dichroic mirror 92 is reflected, and about 80% is allowed to pass. That is, in the B light beam irradiated from the light source 21 to the dichroic mirror 92, 20% of the portion offset from the center of the B light beam is reflected.

The B light beam reflected by the dichroic mirror 92 is diffused by the diffusion plate 26 and is irradiated to the dichroic mirror 92. At this time, the area of the B light beam irradiated to the dichroic mirror 92 is larger than the area of the B light beam irradiated to the dichroic mirror 92 from the light source 21.

Figure 8:
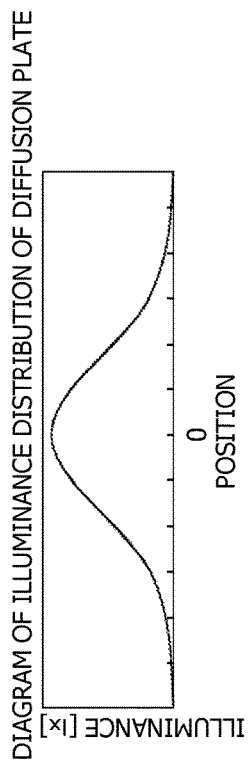
FIG. 8 is a diagram illustrating an illuminance distribution of a diffusion plate according to the first to sixth embodiments.

Next, in the B light beam irradiated from the diffusion plate 26 to the dichroic mirror 92, the ratio of the B light beam reflected from the different characteristic region and the ratio of the B light beam passing through the wide region characteristic region are calculated based on only the area ratio. For example, such a configuration is considered that, in a case where the area expansion rate of the B light incident region by the diffusion plate is 2 by the calculation of the area ratio, as an example, about 10% is reflected and about 90% is allowed to pass due to the shape of the different characteristic region. Herein, unlike the first embodiment, in the third embodiment, the position of the different characteristic region is offset from the central portion where the optical axis 2 and the dichroic mirror are in contact with each other. Herein, in FIG. 8, illustrated is an illuminance distribution diagram of light emitted from the diffusion plate 26. As illustrated in FIG. 8, the illuminance is decreased as the position is deviated from the center position. Then, the position of the different characteristic region is arranged to be offset from the central portion where the optical axis 2 and the dichroic mirror are in contact with each other as in the third embodiment, and thus, even if the area of the different characteristic region is the same as that of the first embodiment, in the B diffusion light from the diffusion plate 26, the B diffusion light of the portion thereof being reflected by the dichroic mirror 92 and returning to the light source 21 has a relatively small intensity at the peripheral angle instead of the peak intensity at the central angle in FIG. 8, so that it is possible to reduce the light returning to the laser light source as compared with FIG. 2 of the first embodiment. For example, in such a configuration where, if the relative ratio effect of the diffusion light intensity in FIG. 8 due to this offset is set to 50%, the area expansion rate of the B light incident region by the diffusion plate is 2, and only in the calculation of the area ratio, about 10% is reflected and about 90% is allowed to pass due to the shape of the different characteristic region, so that about 5% of the B light beam irradiated from the diffusion plate 26 to the dichroic mirror 92 is reflected and about 95% is allowed to pass in consideration of the actual intensity distribution of FIG. 8.

On the other hand, in the B light beam irradiated from the light source 21 to the dichroic mirror 92, the B light beam transmitted through the dichroic mirror 92 is irradiated to the phosphor wheel 28. Then, by setting the optical axis 3 which is an optical axis of the condenser lens 27 as a center, the Y light is emitted from the phosphor wheel 28 and is irradiated to the dichroic mirror 92. Then, the Y light beam is reflected by the wide-area characteristic region of the dichroic mirror 92 and overlaps with the B light beam to be a B+Y light beam.

Figure 9:
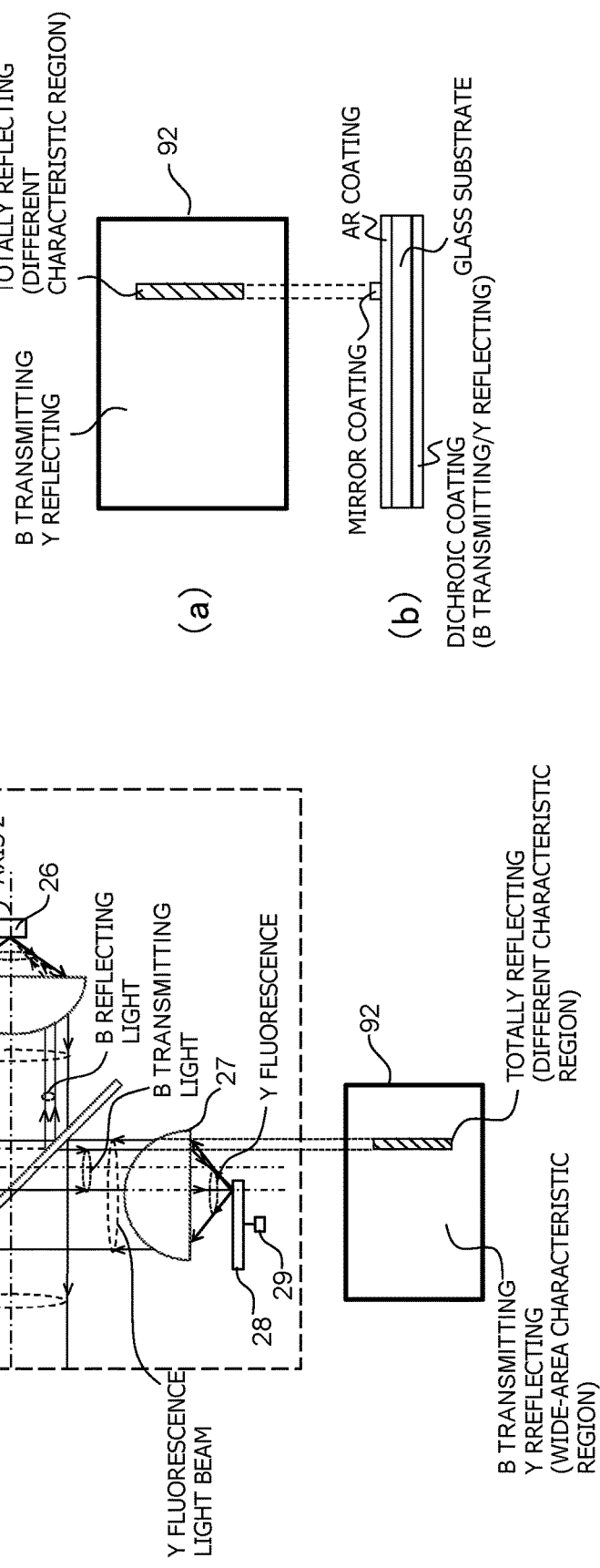
FIG. 9 is a view illustrating a method of coating a B transmitting/Y reflecting region and a totally reflecting region of the dichroic mirror according to the third embodiment.

FIG. 9 is a diagram illustrating a method of coating the B transmitting/Y reflecting region which is a wide-area characteristic region and the totally reflecting region which is a different characteristic region of the dichroic mirror 92 in the present embodiment. FIG. 9(*a*) is a plan view, and FIG. 9(*b*) is a cross-sectional view. As illustrated in FIG. 9(*b*), the dichroic mirror 92 can be manufactured by applying dichroic coating having B reflecting/Y transmitting characteristics on one surface of a glass substrate, applying AR coating on the opposite surface, and applying mirror coating for the totally transmitting region thereon.

According to the present embodiment described above, in the light source apparatus that generates white light by combining B+Y light by using a blue laser as the light source 21, in such a configuration where the dichroic mirror has a characteristic region of the B transmitting/Y reflecting which is a wide-area characteristic region and the totally reflecting region which is a different characteristic region is arranged to be offset from a position to be in contact with the optical axis 2 which is an optical axis of the condenser lens 25, so that the transmission/reflection characteristics are divided into regions, it is possible to increase the B light utilization rate by diffusing the B light by the diffusion plate 26 and expanding the area of the B light.

As described above, according to the present embodiment, it is possible to increase the B light utilization rate as compared with the first embodiment, and it is possible to realize a projector that more appropriately generates white light from a laser light source and that is used for image display.

Fourth Embodiment

The present embodiment describes an example in which, in the projector according to the second embodiment, the different characteristic region in the dichroic mirror in the light source apparatus is arranged at a position offset from a central portion where the optical axis 3 which is an optical axis of the condenser lens 25 and the dichroic mirror are in contact with each other.

Figure 10:
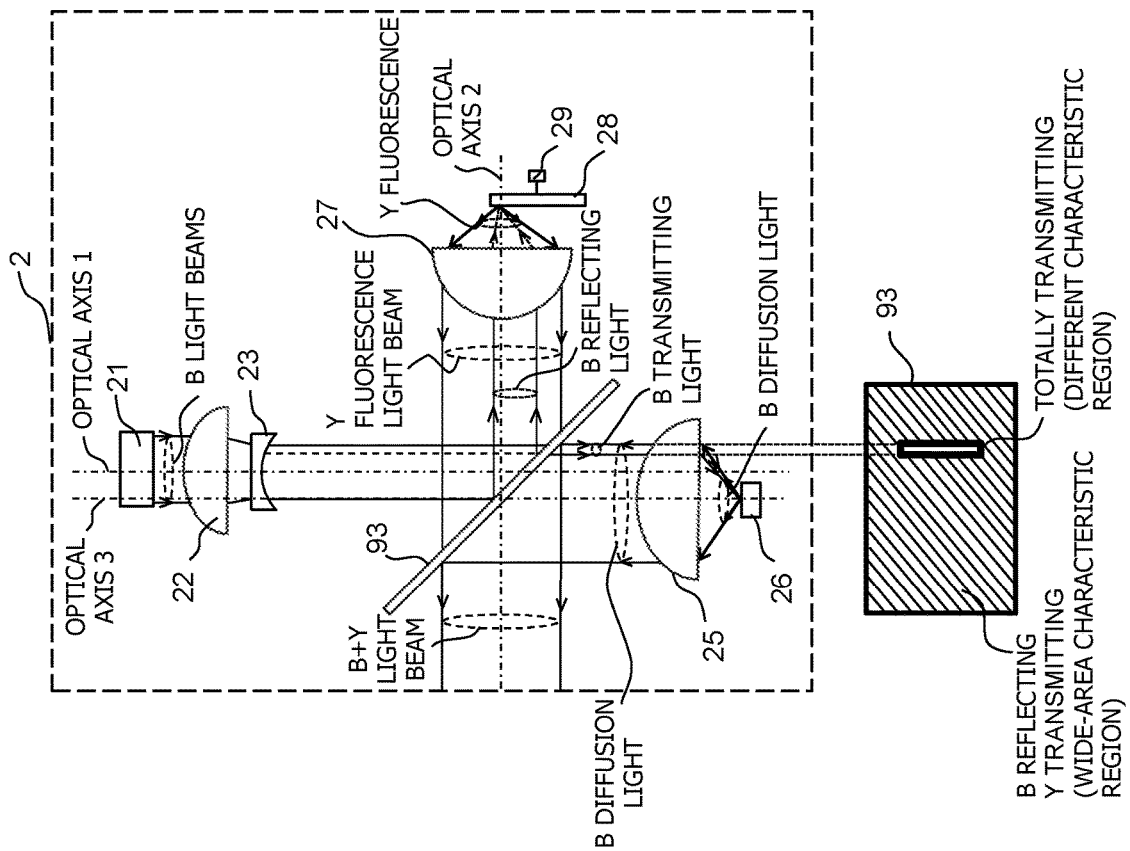
FIG. 10 is a configuration diagram of a light source apparatus and a diagram illustrating transmission/reflection characteristics of a dichroic mirror according to a fourth embodiment.

FIG. 10 is a configuration diagram of the light source apparatus and a diagram illustrating transmission/reflection characteristics of the dichroic mirror according to the present embodiment. In FIG. 10, components having the same functions as those in FIG. 5 are denoted by the same reference numerals, and thus, the description thereof will be omitted.

In FIG. 5 of the second embodiment, the position of the different characteristic region in the dichroic mirror is arranged near the central portion where the optical axis 3 and the dichroic mirror are in contact with each other, and in contrast, in FIG. 10 of the present invention, the position of the different characteristic region is located at the position offset from the central portion where the optical axis 3 and the dichroic mirror are in contact with each other.

In order to change the position of the different characteristic region offset from the central portion where the optical axis 2 and the dichroic mirror are in contact with each other in this manner, simply, within the range where the B light incoming light from the B color laser light source 21 is incident, the different characteristic region may be arranged at a position offset from the central portion where the optical axis 3 and the dichroic mirror are in contact with each other. In addition, by arranging the optical axis 1 of the B color laser light source 21 to be offset from the optical axis 3, the different characteristic region can be arranged to be further offset from the optical axis 3. In FIG. 10, illustrated is an example in which both the offset of the optical axis 1 of the laser light source 21 and the offset from the central portion of the different characteristic region are employed.

In FIG. 10, the B light beam allowed to be parallel by the lens 23 is irradiated to the dichroic mirror 93. Herein, as illustrated, the dichroic mirror 93 has a B reflecting/Y transmitting characteristic region, which is a wide-area characteristic region, and is prepared for a position offset from the position where the totally transmitting region, which is a different characteristic region, is in contact with the optical axis 3. For example, when the ratio of the totally transmitting region, which is a different characteristic region, to the B light region irradiated from the light source 21 to the dichroic mirror is set to 20%, about 80% of the B light beam irradiated to the dichroic mirror 93 is reflected, and about 20% is allowed to pass. That is, in the B light beam irradiated from the light source 21 to the dichroic mirror 93, about 20% of the portion offset from the center of the B light beam is allowed to pass.

The B light beam reflected by the dichroic mirror 93 is irradiated to the phosphor wheel 28. By setting the optical axis 2 which is an optical axis of the condenser lens 27 as a center, Y light is emitted from the phosphor wheel 28 and irradiated to the dichroic mirror 93, and the Y light beam is allowed to pass through the dichroic mirror 93.

On the other hand, in the B light beam emitted from the light source 21 to the dichroic mirror 93, the B light beam passing through the dichroic mirror 93 is irradiated to the diffusion plate 26, and by setting the optical axis 3 which is an optical axis of the condenser lens 25 as a center, the B light beam diffused by the diffusion plate 26 is irradiated to the dichroic mirror 93. At this time, the area of the B light beam irradiated to the dichroic mirror 93 is larger than the area of the B light beam irradiated to the dichroic mirror 93 from the light source 21.

Next, in the B light beam irradiated from the diffusion plate 26 to the dichroic mirror 93, the ratio of the B light beam passing through the different characteristic region and the ratio of the B light beam reflected from the wide-area characteristic region are calculated based on only the area ratio. For example, such a configuration is considered that, in a case where the area expansion rate of the B light incident region by the diffusion plate is 2, as an example, 10% is allowed to pass and about 90% is reflected due to the shape of the different characteristic region. Herein, unlike the second embodiment, in the present embodiment, the position of the different characteristic region is offset from the central portion where the optical axis 3 and the dichroic mirror are in contact with each other. Herein, as illustrated in FIG. 8, the illuminance of the light emitted from the diffusion plate 26 is decreased as the position is deviated from the center position. Then, the position of the different characteristic region is arranged to be offset from the central portion where the optical axis 3 and the dichroic mirror are in contact with each other as in the third embodiment, and thus, even if the area of the different characteristic region is the same as that of the second embodiment, in the B diffusion light from the diffusion plate 26, the B diffusion light of the portion thereof being allowed to pass through the dichroic mirror 93 and returning to the light source 21 has a relatively small intensity at the peripheral angle instead of the peak intensity at the central angle in FIG. 8, so that it is possible to reduce the light returning to the laser light source as compared with FIG. 5 of the second embodiment. For example, in such a configuration where, if the relative ratio effect of the diffusion light intensity in FIG. 8 due to this offset is set to 50%, the area expansion rate of the B light incident region by the diffusion plate is 2, and only in the calculation of the area ratio, about 10% is allowed to pass and about 90% is reflected due to the shape of the different characteristic region, so that about 5% of the B light beam irradiated from the diffusion plate 26 to the dichroic mirror 93 is allowed to pass and about 95% is reflected in consideration of the actual intensity distribution of FIG. 8.

Then, the B light beam reflected by the wide-area characteristic region of the dichroic mirror 93 is allowed to overlap with the Y light beam to become a B+Y light beam.

Figure 11:
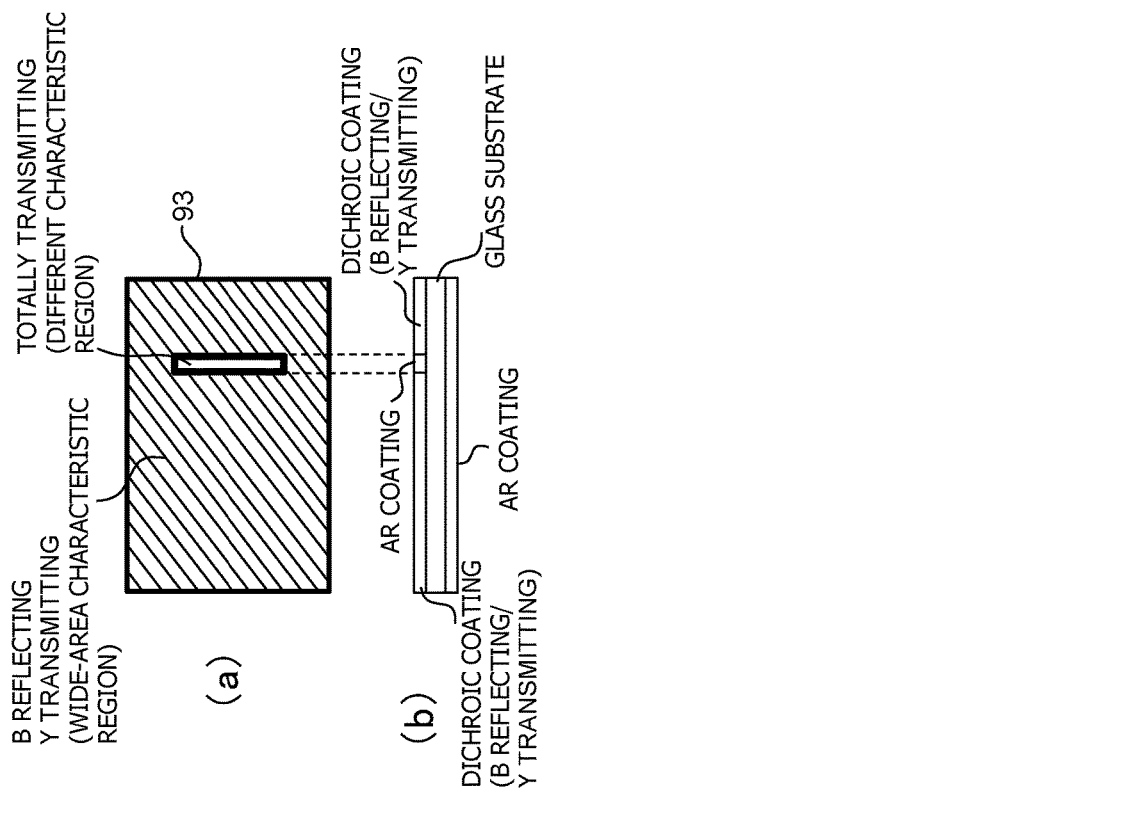
FIG. 11 is a diagram illustrating a method of coating a B reflecting/Y transmitting region and a totally transmitting region of the dichroic mirror according to the fourth embodiment.

FIG. 11 is a diagram illustrating a method of coating the B reflecting/Y transmitting region, which is a wide-area characteristic region, and the totally transmitting region, which is a different characteristic region, of the dichroic mirror 93 in the present embodiment. FIG. 11(*a*) is a plan view, and FIG. 11(*b*) is a cross-sectional view. As illustrated in FIG. 11(*b*), the dichroic mirror 93 can be manufactured by applying AR coating on one surface of a glass substrate and applying dichroic coating having B reflecting/Y transmitting characteristics and AR coating for the totally transmitting region on the opposite surface.

According to the present embodiment described above, in the light source apparatus that generates white light by combining B+Y light by using a blue laser as the light source 21, in such a configuration where the dichroic mirror 93 has a characteristic region of the B transmitting/Y reflecting which is a wide-area characteristic region and the totally reflecting region which is a different characteristic region is arranged to be offset from a position to be in contact with the optical axis 3 which is an optical axis of the condenser lens 25, so that the transmission/reflection characteristic is region-divided, it is possible to increase the B light utilization rate by diffusing the B light by the diffusion plate 26 and expanding the area of the B light.

As described above, according to the present embodiment, it is possible to increase the B light utilization rate as compared with the second embodiment, and it is possible to realize a projector that more appropriately generates white light from a laser light source and that is used for image display.

Fifth Embodiment

The present embodiment describes an example in which, in the projector described in the first to fourth embodiments, dimming and/or color toning are performed by changing intensities of lasers by using a divisional configuration of a transmission/reflection region of a dichroic mirror and a plurality of the lasers as light sources.

Figure 12:
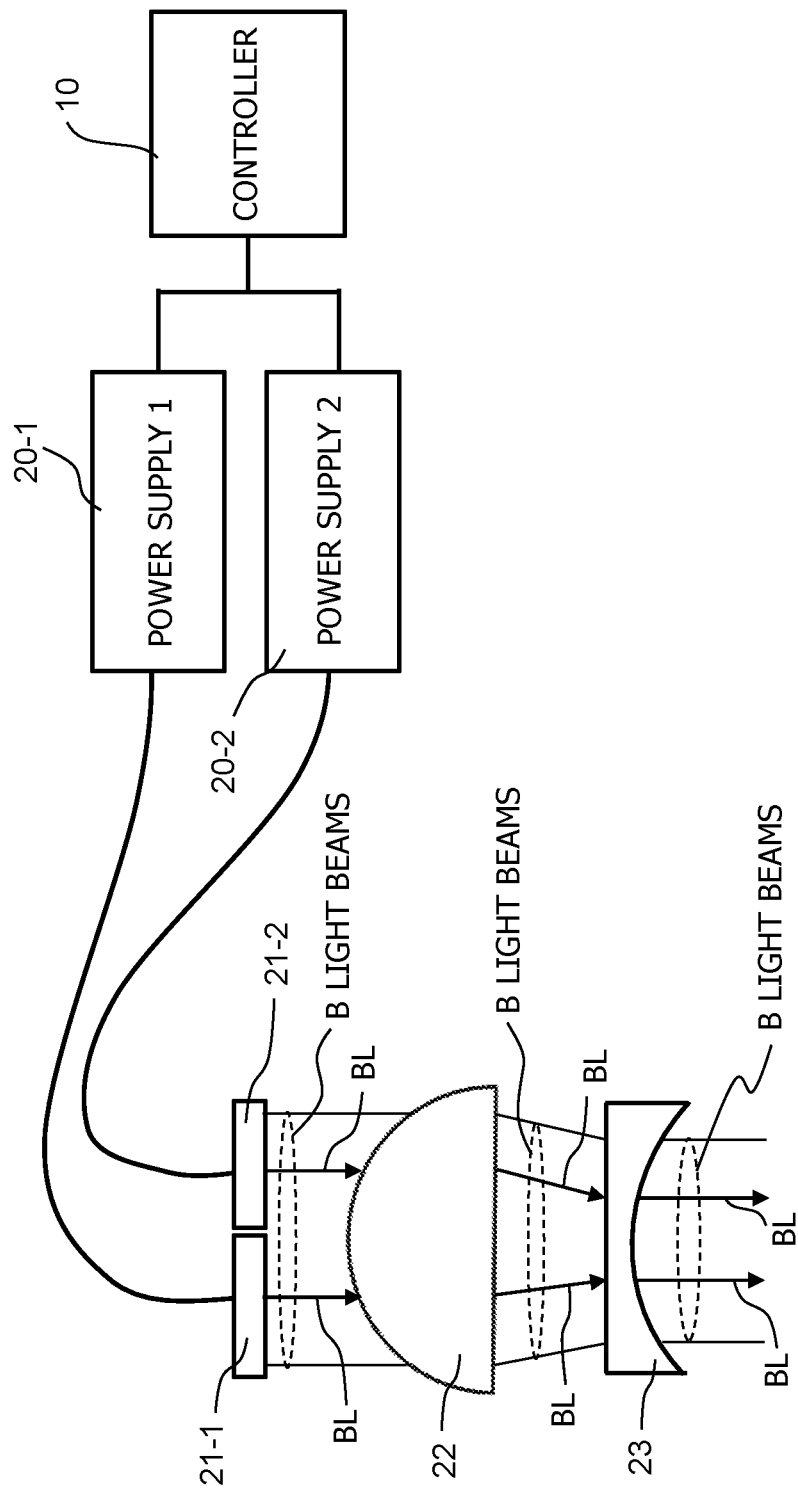
FIG. 12 is a schematic configuration diagram of a light source portion of a light source apparatus according to a fifth embodiment.

FIG. 12 is a schematic configuration diagram of a light source portion of the light source apparatus according to the present embodiment. FIG. 12 illustrates details of the configuration of the light source 21 in the configuration of the light source apparatus of FIG. 2A, FIG. 5, FIG. 7, or FIG. 10. More specifically, two light sources 21-1 and 21-2 are used as the light sources 21, the respective light sources are driven by the power supply 1 (20-1) and the power supply 2 (20-2), and a controller 10 controlling the power supply 1 and the power supply 2 is provided.

Figure 13:
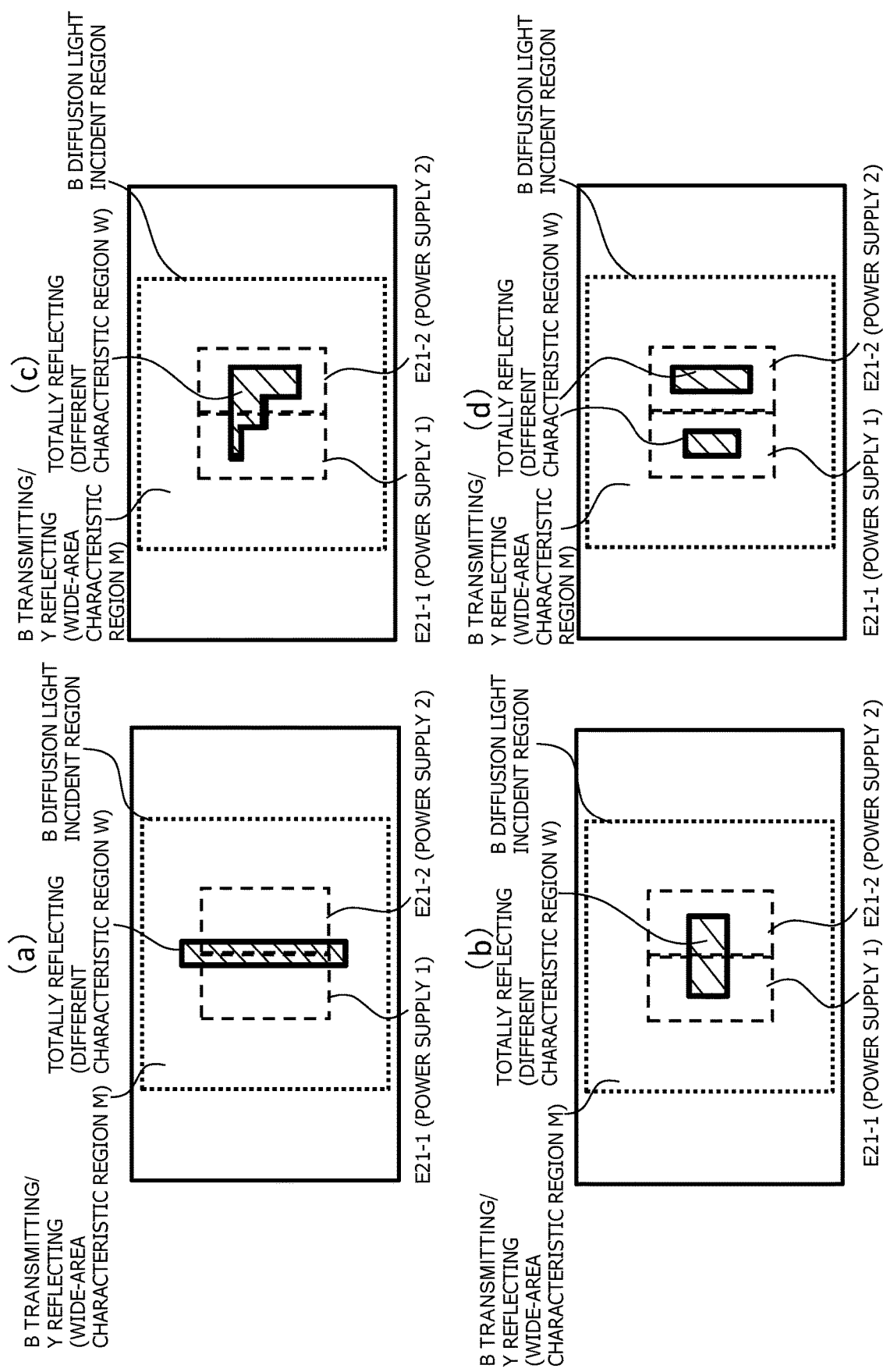
FIG. 13 is a diagram illustrating a divisional configuration of transmission/reflection regions of a dichroic mirror corresponding to the first embodiment and a modification thereof in the fifth embodiment.

FIG. 13 is a diagram illustrating a divisional configuration of the transmission/reflection region of the dichroic mirror corresponding to the first embodiment (the configuration of FIG. 2A) and a modification thereof. FIG. 13(*a*) is a configuration corresponding to the first embodiment. In FIG. 13(*a*), an irradiation region E21-1 irradiated with the B light from the light source 21-1 and an irradiation region E21-2 irradiated with the B light from the light source 21-2 are provided in the respective regions that extend over the B transmitting/Y reflecting region (wide-area characteristic region M) and the totally reflecting region (different characteristic region W). In addition, the combined region of the irradiation region E21-1 irradiated with the B light from the light source 21-1 and the irradiation region E21-2 irradiated with the B light from the light source 21-2 corresponds to the region I of FIG. 3(*c*). In addition, the B diffusion light incident region illustrated in FIG. 13(*a*) corresponds to the region O in FIG. 3(*c*).

In the example of FIG. 13(*a*), the regions are arranged symmetrically to the left and right, and thus, the ratio between the wide-area characteristic region M and the different characteristic region W in the irradiation region E21-1 and the ratio between the wide-area characteristic region M and the different characteristic region W in the irradiation region E21-2 are the same as each other. Therefore, when the laser intensities of the light sources 21-1 and 21-2 are changed, it is possible to realize a dimming function of adjusting the intensity of the light output from the light source apparatus 2 without changing the ratio between the B light and the Y light output from the light source apparatus 2.

FIG. 13(*b*) is a modified example of the region division of FIG. 13(*a*), and unlike FIG. 13(*a*), the totally reflecting region which is a different characteristic region W is wide in the width direction of the paper and corresponds to the region (corresponding to the region I in FIG. 3(c)) in which the irradiation region E21-1 irradiated with the B light from the light source 21-1 and the irradiation region E21-2 irradiated with the B light from the light source 21-2 are combined. In the example of FIG. 13(b), since the different characteristic region W is included in the region I, the different characteristic region W corresponds to both the region WI and the region WO in the example of FIG. 3(c). As described in the first embodiment, in the light source apparatus 2, as the ratio β of SWO which is the size of the different characteristic region in the incident region O of the B diffusion light to SWI which is the size of the different characteristic region in the incident region I of the B incoming light becomes smaller, the B light utilization rate as a light source apparatus becomes better. Herein, by allowing the different characteristic region W to be included in the region I, β=1 can be set, and thus, it is possible to minimize β.

In addition, the B light use efficiency E2 of the configuration of FIG. 3(b) described in the first embodiment is always higher than the B light use efficiency E1 of the configuration of FIG. 3(a) when β/α is smaller than 1. Then, if β=1 can be achieved by allowing the different characteristic region W to be included in the region I, α is larger than 1 due to the effects of the condenser lens 25 and the diffusion plate 26, and thus, the B light use efficiency of the configuration of FIG. 3(b) t is always higher than that of the configuration of FIG. 3(a).

Then, if the configuration is such that the different characteristic region W is included in the region I as illustrated in FIG. 13(b), it is possible to allow the B light utilization rate to be higher than that of the configuration in which the different characteristic region W is not included in the region I as illustrated in FIG. 13(a).

In addition, in the configuration of FIG. 13(a), since the different characteristic region W is elongated at the vertical boundary between the irradiation region E21-1 and the irradiation region E21-2, in a case where the position of the irradiation region E2-1, the position of the irradiation region E21-2, and the relative position of the dichroic mirror in the left and right directions are greatly deviated due to the assembly accuracy of the optical components and the like, the ratio between the wide-area characteristic region M and the different characteristic region W in the irradiation region E21-1 and the ratio between the wide-area characteristic region M and the different characteristic region W in the irradiation region E21-2 is greatly changed. For example, in a case where the B light irradiated to the totally reflecting region which is a different characteristic region W is only one of the left and right light sources due to the deviation of the relative position, when the power supply that controls the one laser light source fails, only the light that has passed through the wide-area characteristic region M in the light incident on the dichroic mirror from the light source is used, and thus, one (the example in FIG. 13(a)) of the B light or the Y light from the light source apparatus 2 is output, in this case, only the Y light is output, so that it is impossible to generate white light. In contrast, in the configuration illustrated in FIG. 13(b), since the totally reflecting region, which is a different characteristic region W is wide in the width direction, even if the deviation of the relative position in the left-right direction occurs, the B light irradiated to the totally reflecting region which is a different characteristic region W is unlikely to be only one of the left and right light sources.

Accordingly, in the configuration of FIG. 13(b), even in a case where the power supply for controlling one laser light source is out of order, it is possible to avoid the phenomenon that the output light from the light source apparatus 2 becomes one of the B light and the Y light.

In addition, FIG. 13(c) is a modified example of still another region division. In the example of FIG. 13(c), unlike the examples of FIGS. 13(a) and 13(b), the totally reflecting region which is a different characteristic region W is configured to be asymmetrical on the left and right. Accordingly, the ratio between the wide-area characteristic region M and the different characteristic region W in the irradiation region E21-1 and the ratio between the wide-area characteristic region M and the different characteristic region W in the irradiation region E21-2 are allowed to be different from each other. Accordingly, the ratio between the B light and the Y light in which the B light from the light source 21-1 finally contributes to the output light of the light source apparatus 2 and the ratio between the B light and the Y light in which the B light from the light source 21-2 finally contributes to the output light of the light source apparatus 2 can be allowed to be different. Then, the light intensity of the light source 21-1 is variably controlled by controlling the power supply 1, or the light intensity of the light source 21-2 is variably controlled by controlling the power supply 2, and thus, by changing the relative ratio between the light intensity of the light source 21-1 and the light intensity of the light source 21-2, it is possible to control both the color and the intensity of the light output from the light source apparatus 2. That is, a color toning function and a dimming function of the light output from the light source apparatus 2 can be realized.

In the example of FIG. 13(c), since the different characteristic region W is included in the region (region I) in which the irradiation region E21-1 and the irradiation region E21-2 are combined, there is also an advantage in that the B light utilization rate is high.

In addition, FIG. 13(d) is a modified example of still another region division. In the example of FIG. 13(d), similarly to the example of FIG. 13(c), the ratio between the wide-area characteristic region M and the different characteristic region W in the irradiation region E21-1 and the ratio between the wide-area characteristic region M and the different characteristic region W in the irradiation region E21-2 are allowed to be different from each other. Therefore, similarly to the example of FIG. 13(c), the light intensity of the light source 21-1 is variably controlled by controlling the power supply 1, or the light intensity of the light source 21-2 is variably controlled by controlling the power supply 2, and thus, by changing the relative ratio between the light intensity of the light source 21-1 and the light intensity of the light source 21-2, it is possible to control both the color and the intensity of the light output from the light source apparatus 2.

In addition, in the example of FIG. 13(d), as the different characteristic region W (totally reflecting region), an independent shape is provided for each irradiation region from the left and right light sources. In addition, the respective different characteristic regions W are provided at the positions apart from the boundaries of the irradiation regions from the left and right light sources. Accordingly, it is possible to provide a configuration in which, due to the assembling accuracy of the optical components, even if the relative positions of the different characteristic region W of the dichroic mirror to the position of the irradiation region E21-1 and the position of the irradiation region E21-2 are deviated in the horizontal direction or deviated in the vertical direction, the ratio between the wide-area characteristic region M and the different characteristic region W in the irradiation region E21-1 and the ratio between the wide-area characteristic region M and the different characteristic region W in the irradiation region E21-2 are hard to change.

That is, the example of FIG. 13(*d*) is a preferable mode because it is possible to achieve both the realization of the color toning function and the dimming function of the light output from the light source apparatus 2 and the reduction of the influence of the deviation between the position of the irradiation region E21-1 and the position of the irradiation region E21-2 and the relative position of the different characteristic region W of the dichroic mirror due to the assembly accuracy of the optical components, and the like.

In addition, in the example of FIG. 13(*d*), since the different characteristic region W is included in the region (region I) in which the irradiation region E21-1 and the irradiation region E21-2 are combined, there is also an advantage in that the B light utilization rate is high.

As described above, a plurality of the examples that are the examples of the shape of the different characteristic region W of the first embodiment (the configuration of FIG. 2A) and the modified examples thereof have been described with reference to FIG. 13. In addition, the modified examples thereof can also be applied to the case where the optical axis 1 of the light source 21 is offset with respect to the optical axis 3 having a mirror relationship with the optical axis 2 of the condenser lens 25 as illustrated in FIG. 7 of the third embodiment.

Figure 14:
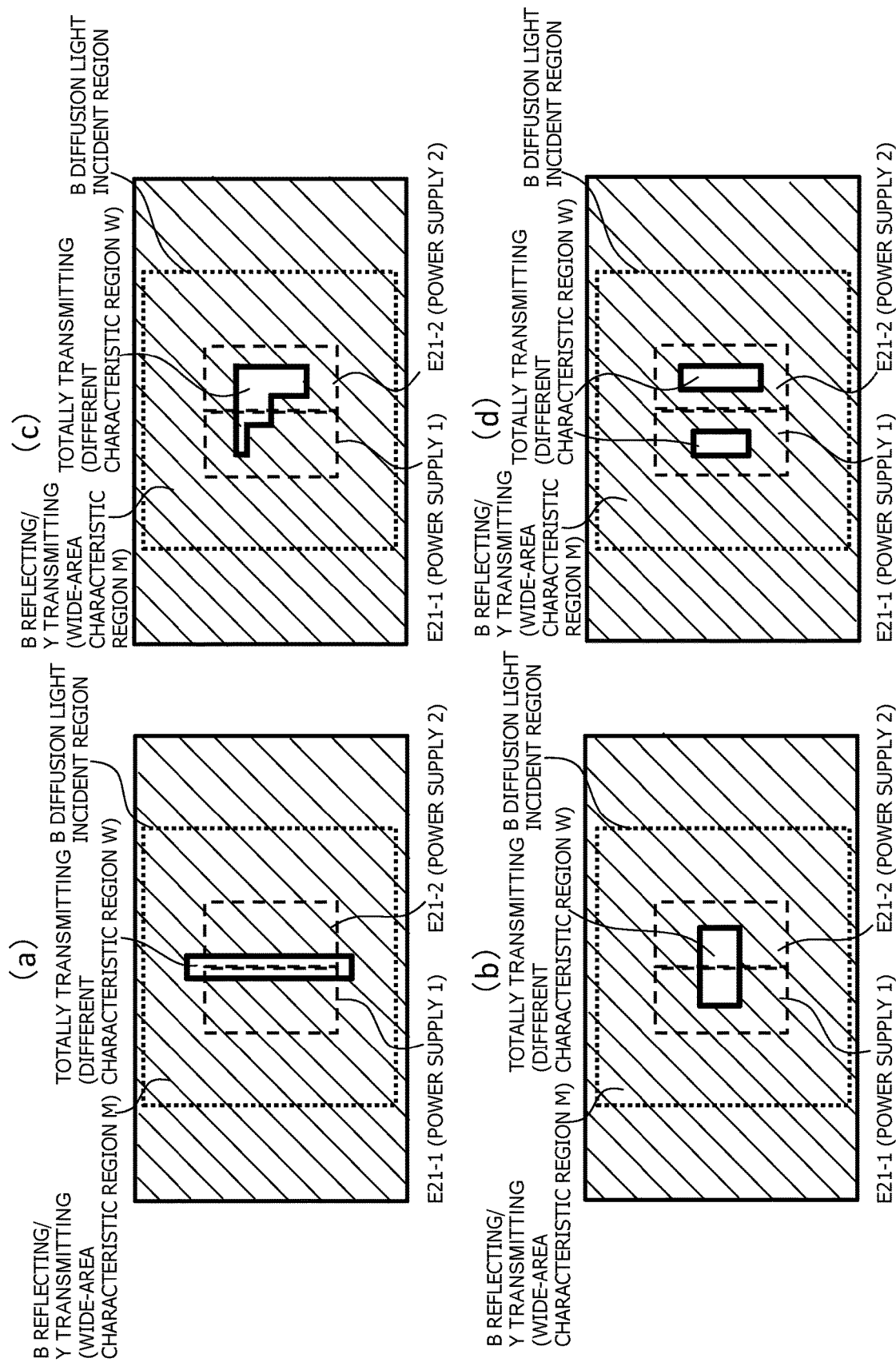
FIG. 14 is a diagram illustrating a divisional configuration of transmission/reflection regions of a dichroic mirror corresponding to the second embodiment and a modification thereof in the fifth embodiment.

In addition, FIG. 14 is a diagram illustrating a divisional configuration of the transmission/reflection region of a dichroic mirror corresponding to the second embodiment and the modified examples thereof. FIG. 14(*a*) is a configuration corresponding to the second embodiment. FIG. 14(*a*) illustrates the example of a case where the configuration illustrated in FIG. 12 is employed as the light source 21 in the configuration of FIG. 5 of the second embodiment, and FIGS. 14(*b*), 14(*c*), and 14(*d*) are the modified examples thereof.

Herein, the examples of the divisional configuration of the transmission/reflection region of the dichroic mirror illustrated in FIGS. 14(*a*), 14(*b*), 14(*c*), and 14(*d*) are obtained from the examples of the divisional configuration of the transmission/reflection region of the dichroic mirror illustrated in FIGS. 13(*a*), 13(*b*), 13(*c*), and 13(*d*) by replacing the characteristics of the wide-area characteristic region M with B reflecting/Y transmitting and replacing the characteristics of the different characteristic region W with totally transmitting so as to correspond to the second embodiment. If the description of each FIG. 13 is replaced in response to the change in the characteristics, the description of the configurations and the effects for each FIG. 14 will be made. For this reason, the description of each FIG. 14 is replaced with the description of each FIG. 13, and thus, the redundant description is omitted.

A plurality of the examples that are the examples of the shape of the different characteristic region W of the second embodiment and modified examples thereof have been described with reference to the divisional configuration example of the transmission/reflection region of the dichroic mirror illustrated in each FIG. 14 as described above. In addition, the modified examples thereof can also be applied to the case where the optical axis 1 of the light source 21 is offset with respect to the optical axis 3 having a mirror relationship with the optical axis 2 of the condenser lens 25 as illustrated in FIG. 10 of the fourth embodiment.

According to the divisional configuration example of the transmission/reflection region of the dichroic mirror of the present embodiment described above, it is possible to achieve one of the effects of the improvement of the B light utilization rate, the realization of the dimming function, the realization of the color toning function, or the reduction of the influence of the deviation of the relative position due to the assembling accuracy of the optical components or combinations thereof in response to the relationship between the shape of the different characteristic region W and the irradiation regions of the plurality of light sources on the dichroic mirror.

In addition, in the description of each of FIGS. 13 and 14 of the present embodiment, the example in which the irradiation region E21-1 and the irradiation region E21-2 do not overlap with each other has been described. However, the irradiation region E21-1 and the irradiation region E21-2 may partially overlap with each other, and even this case is a mode of a modified example of the present embodiment. At this time, if the ratio between the wide-area characteristic region M and the different characteristic region W in each irradiation region satisfies the above description, it is possible to achieve the same effects as those described above.

Sixth Embodiment

In the fifth embodiment, the two lasers are used as the light source of the projector, and in contrast, in the present embodiment, a case where three lasers are used as the light source of the projector will be described.

Figure 15:
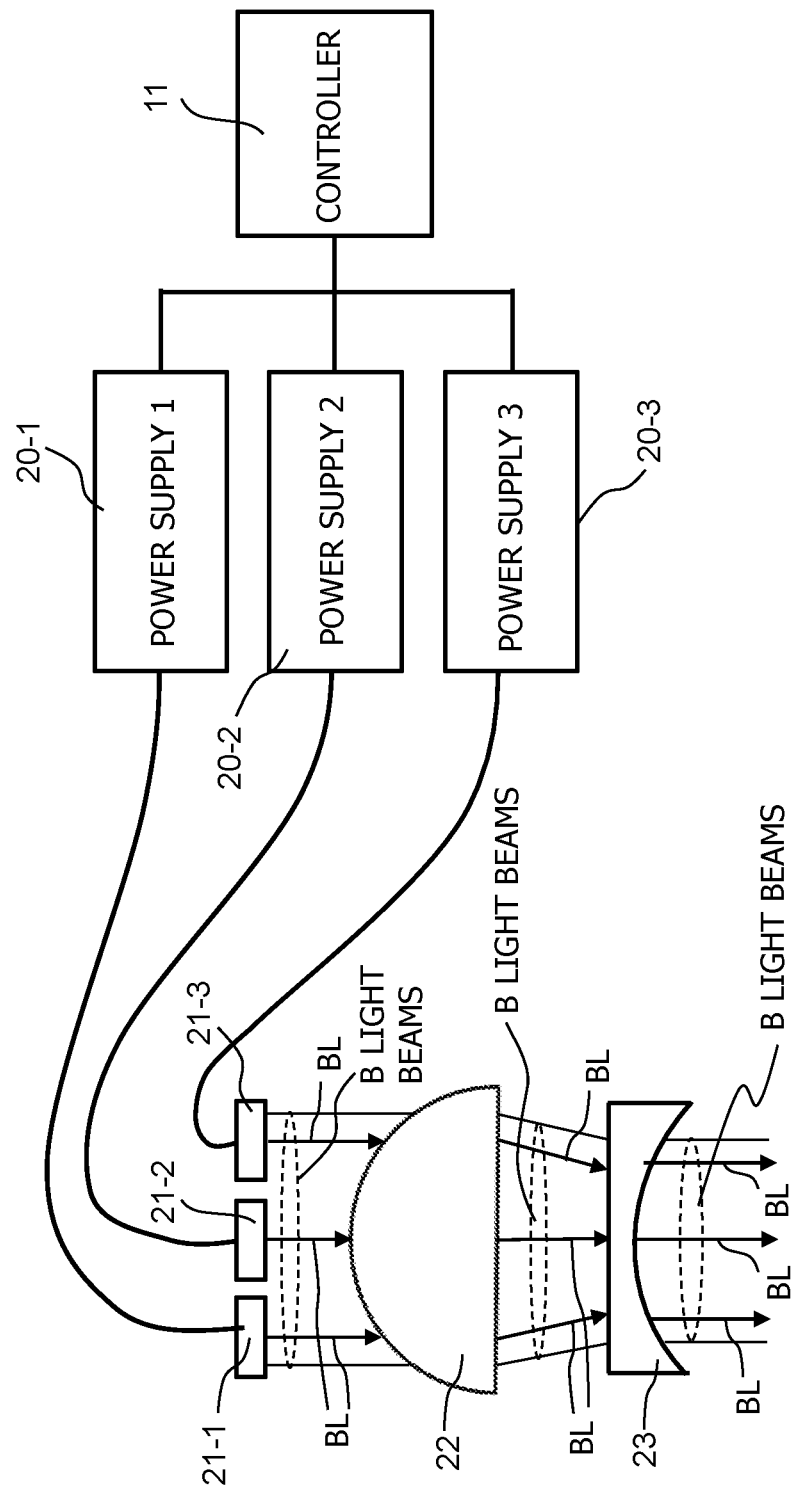
FIG. 15 is a schematic configuration diagram of a light source portion of a light source apparatus according to a sixth embodiment.

FIG. 15 is a schematic configuration diagram of a light source portion of the light source apparatus according to the present embodiment. In FIG. 15, in the configuration of the light source apparatus illustrated in FIG. 2A, FIG. 5, FIG. 7 or FIG. 10, three light sources 21-1, 21-2, and 21-3 are used, the respective light sources are driven by a power supply 1 (20-1), a power supply 2 (20-2) and a power supply 3 (20-3), and a controller 11 for controlling the respective power supplies 1, 2 and 3 is provided.

Figure 16:
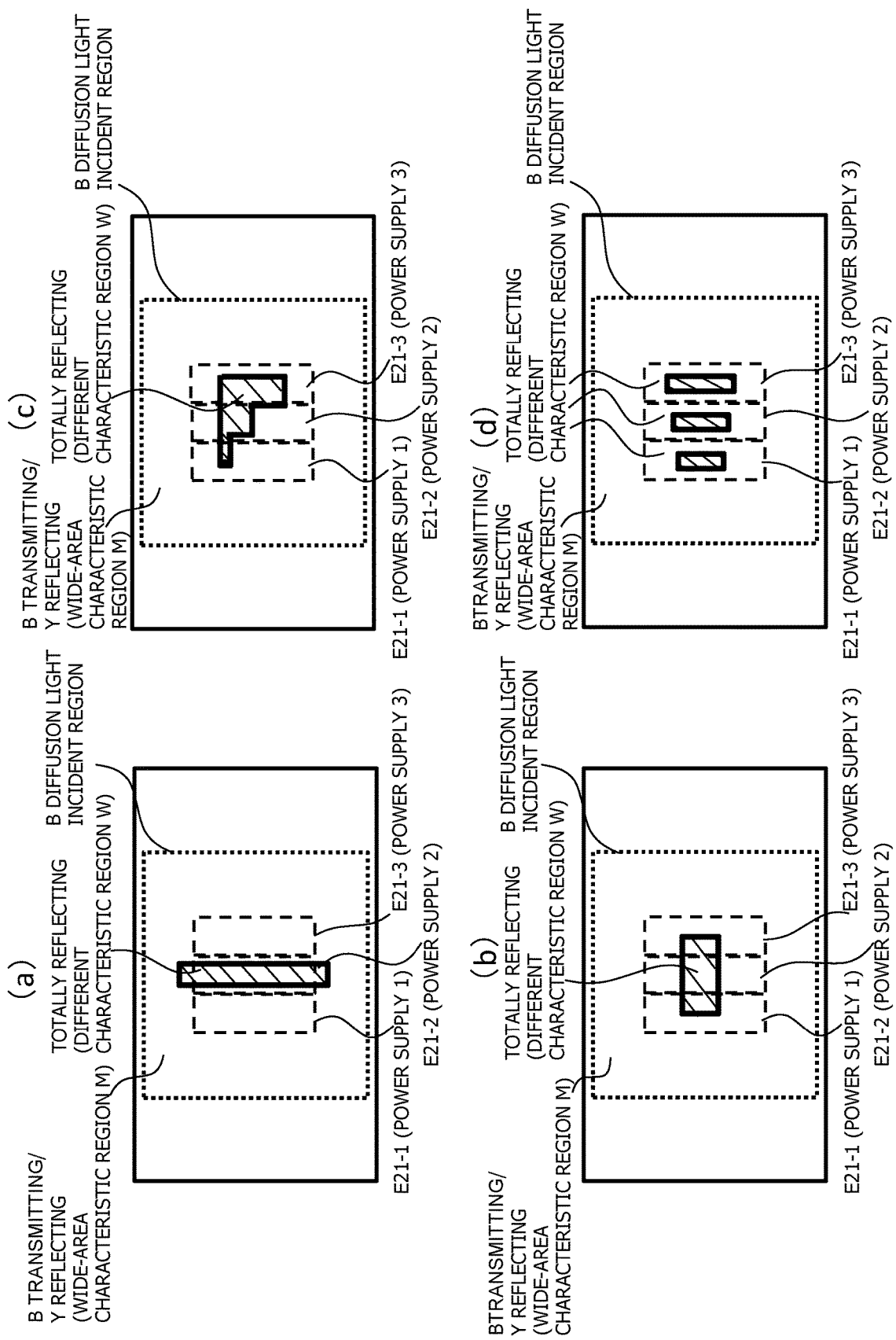
FIG. 16 is a diagram illustrating a divisional configuration of transmission/reflection regions of a dichroic mirror corresponding to the first embodiment and a modification thereof in the sixth embodiment.

FIG. 16 is a diagram illustrating a divisional configuration of the transmission/reflection region of the dichroic mirror corresponding to the first embodiment (the configuration of FIG. 2A) and a modification thereof. FIG. 16(*a*) is a configuration corresponding to the first embodiment. In FIG. 16(*a*), an irradiation region E21-1 irradiated with the B light from the light source 21-1 is provided in the left-side B transmitting/Y reflecting region (wide-area characteristic region M), an irradiation region E21-2 irradiated with the B light from the light source 21-2 is provided in the region that extends over the left-side B transmitting/Y reflecting region (wide-area characteristic region M), the totally reflecting region (different characteristic region W), and the right-side B transmitting/Y reflecting region (wide-area characteristic region M, and an irradiation region E21-3 irradiated with the B light from the light source 21-3 is provided in the right-side B transmitting/Y reflecting region (wide-area characteristic region M). Since the ratio between the wide-area characteristic region M and the different characteristic region W in the irradiation region E21-2 and the ratios between the wide-area characteristic region M and the different characteristic region W in the irradiation region E21-1 and the irradiation region E21-3 (in the drawing, 0% for the different characteristic region W) are different, the ratio of the B light to the Y light output from the light source apparatus 2 is changed by changing the intensities of the lasers of the light sources 21-1, 21-2, and 21-3, so that it is possible to realize the color toning function and the dimming function.

FIG. 16(*b*) is a modified example of the region division of FIG. 16(*a*), and unlike FIG. 16(*a*), the totally reflecting region which is a different characteristic region W is wide in the width direction of the paper and corresponds to the region (corresponding to the region I in FIG. 3(c)) in which the irradiation region E21-1 irradiated with the B light from the light source 21-1, the irradiation region E21-2 irradiated with the B light from the light source 21-2, and the irradiation region E21-3 irradiated with the B light from the light source 21-3 are combined. With this configuration, similarly to the description of FIG. 13(b), it is possible to set β=1 in the B light use efficiency. Accordingly, it is possible to increase the B light use efficiency.

In addition, in the configuration of FIG. 16(a), when the power supply 20-2 fails, only the light that has passed through the wide-area characteristic region M in the light incident on the dichroic mirror from the light source is used, and thus, only the Y light is output from the light source apparatus 2, so that it is impossible to reproduce white light. In contrast, in the configuration of FIG. 16(b), the totally reflecting region which is a different characteristic region W covers all of the irradiation region E21-1, the irradiation region E21-2, and the irradiation region E21-3.

Accordingly, in the configuration of FIG. 16(b), even in a case where one of the plurality of power supplies for controlling the laser light source fails, it is possible to avoid the phenomenon where the light output from the light source apparatus 2 becomes one of the B light and the Y light.

In addition, FIG. 16(c) is a modified example of the region division. In FIG. 13(c), the number of irradiation regions of the plurality of laser light sources is two, and in contrast, in the configuration of FIG. 16(c), the number of irradiation regions E21-1, E21-2, and E21-3 is increased to three. In addition, all the ratios between the wide-area characteristic region M and the different characteristic region W in the three irradiation regions are changed.

Then, by variably controlling the light intensity of the light source 21-1, the light intensity of the light source 21-2, and the light intensity of the light source 21-3, it is possible to control both the color and the intensity of the light output from the light source apparatus 2, and since the number of divided regions is larger than that of FIG. 13(c), it is possible to improve the resolution of the control of the color and intensity.

In addition, FIG. 16(d) is a modified example of the region division. In the example of FIG. 16(d), similarly to the example of FIG. 16(c), the ratio between the wide-area characteristic region M and the different characteristic region W in the irradiation region E21-1 the ratio between the wide-area characteristic region M and the different characteristic region W in the irradiation region E21-2, and the ratio between the wide-area characteristic region M and the different characteristic region W is different from the ratio between the wide-area characteristic region M and the different characteristic region W in the irradiation region E21-3 are allowed to be different from each other. Therefore, similarly to the example of FIG. 16(c), it is possible to control both the color and the light intensity of the light output from the light source apparatus 2 by variably controlling the light intensity of the light source 21-1, the light intensity of the light source 21-2, and the light intensity of the light source 21-3, and since both the color and the intensity can be controlled, and the number of divided regions is larger than that in FIG. 13(d), it is possible to improve the resolution of the control of the color and the intensity.

In addition, in the example of FIG. 16(d), the different characteristic regions W (totally reflecting regions) have independent shapes for the respective irradiation regions from the three light sources. In addition, the different characteristic regions W are provided at positions apart from the boundary of each irradiation region. Accordingly, it is possible to provide a configuration in which, due to the assembling accuracy of the optical components, even if the relative positions of the different characteristic region W of the dichroic mirror to the position of the irradiation region E21-1, the position of the irradiation region E21-2, and the position of the irradiation region E21-3 are deviated in the horizontal direction or deviated in the vertical direction, the ratio between the wide-area characteristic region M and the different characteristic region W in the irradiation region E21-1, the ratio between the wide-area characteristic region M and the different characteristic region W in the irradiation region E21-2, and the ratio between the ratio between the wide-area characteristic region M and the different characteristic region W in the irradiation region E21-3 are hard to change.

That is, the example of FIG. 16(d) is a preferable mode because it is possible to achieve both the realization of the color toning function and the dimming function of the light output from the light source apparatus 2 and the reduction of the influence of the deviation between the position of the irradiation region E21-1, the position of the irradiation region E21-2, and the position of the irradiation region E21-3 and the relative position of the different characteristic region W of the dichroic mirror due to the assembly accuracy of the optical components, and the like.

In addition, in the example of FIG. 16(d), since the different characteristic region W is included in the region (region I) in which the irradiation region E21-1 and the irradiation region E21-2 and the irradiation region E21-3 are combined, there is also an advantage in that the B light utilization rate is high.

As described above, a plurality of the examples that are the examples of the shape of the different characteristic region W of the first embodiment (the configuration of FIG. 2A) and the modified examples thereof have been described with reference to FIG. 16. In addition, the modified examples thereof can also be applied to the case where the optical axis 1 of the light source 21 is offset with respect to the optical axis 3 having a mirror relationship with the optical axis 2 of the condenser lens 25 as illustrated in FIG. 7 of the third embodiment.

Figure 17:
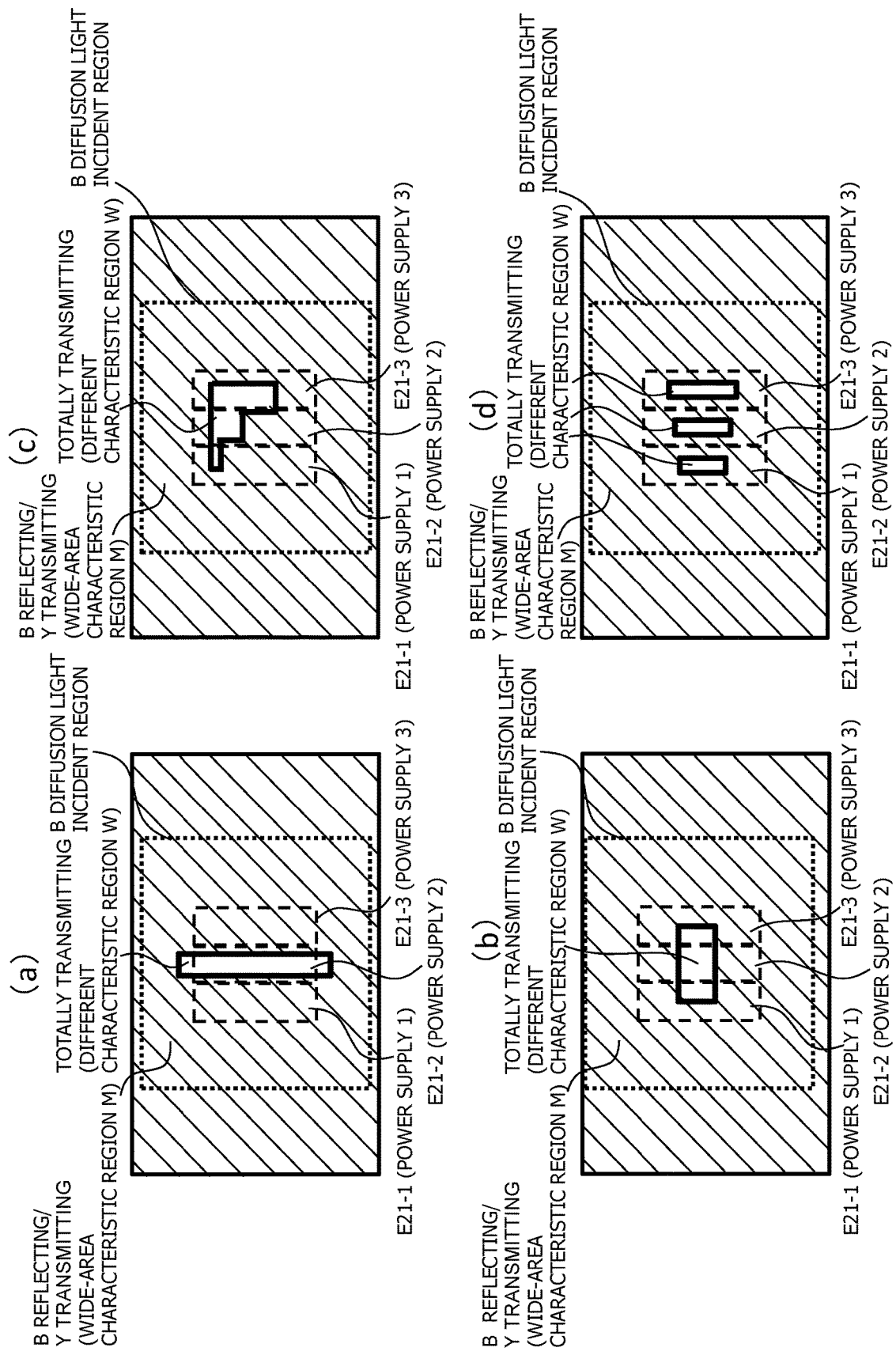
FIG. 17 is a diagram illustrating a divisional configuration of transmission/reflection regions of a dichroic mirror corresponding to the second embodiment and a modification thereof in the sixth embodiment.

In addition, FIG. 17 is a diagram illustrating a divisional configuration of the transmission/reflection region of a dichroic mirror corresponding to the second embodiment and modified examples thereof. FIG. 17(a) is a configuration corresponding to the second embodiment. FIG. 17(a) illustrates the example of a case where the configuration illustrated in FIG. 15 is employed as the light source 21 in the configuration illustrated in FIG. 5 according to the second embodiment, and FIGS. 17(b), 17(c), and 17(d) are the modified examples thereof.

Herein, the examples of the divisional configuration of the transmission/reflection region of the dichroic mirror illustrated in FIGS. 17(a), 17(b), 17(c), and 17(d) are obtained from the examples of the divisional configuration of the transmission/reflection region of the dichroic mirror illustrated in FIGS. 16(a), 16(b), 16(c), and FIG. 16(d) by replacing the characteristics of the wide-area characteristic region M with B reflecting/Y transmitting and replacing the characteristics of the different characteristic region W with totally transmitting so as to correspond to the second embodiment. If the description of FIG. 16 is replaced in response to the change in the characteristics, the description of the configurations and the effects for each FIG. 17 will be made. For this reason, the description of each FIG. 17 is replaced with the description of each FIG. 16, and thus, the redundant description is omitted.

A plurality of the examples that are the examples of the shape of the different characteristic region W of the second embodiment and the modified examples thereof have been described with reference to the divisional configuration example of the transmission/reflection region of the dichroic mirror illustrated in each FIG. 17 as described above. In addition, the modified examples thereof can also be applied to the case where the optical axis 1 of the light source 21 is offset with respect to the optical axis 3 having a mirror relationship with the optical axis 2 of the condenser lens 25 as illustrated in FIG. 10 of the fourth embodiment.

According to the divisional configuration example of the transmission/reflection region of the dichroic mirror of the present embodiment described above, it is possible to achieve one of the effects of the improvement of the B light utilization rate, the realization of the dimming function, the realization of the color toning function, or the reduction of the influence of the deviation of the relative position due to the assembling accuracy of the optical components or combinations thereof in response to the relationship between the shape of the different characteristic region W and the irradiation regions of the plurality of light sources on the dichroic mirror.

In addition, in the dimming function and the color toning function, the resolution can be further improved.

In addition, in the description of FIGS. 16 and 17 of the present embodiment, the example in which the irradiation region E21-1, the irradiation region E21-2, and the region E21-3 do not overlap with each other has been described. However, the irradiation region E21-1, the irradiation region E21-2, and the region E21-3 may partially overlap with each other, and even this case is a mode of a modified example of the present embodiment. At this time, if the ratio between the wide-area characteristic region M and the different characteristic region W in each irradiation region satisfies the above description, it is possible to achieve the same effects as those described above.

Seventh Embodiment

In the present embodiment, an embodiment in which a more suitable projector can be realized by using an alumina ceramic plate as a diffusion plate will be described.

Figure 18:
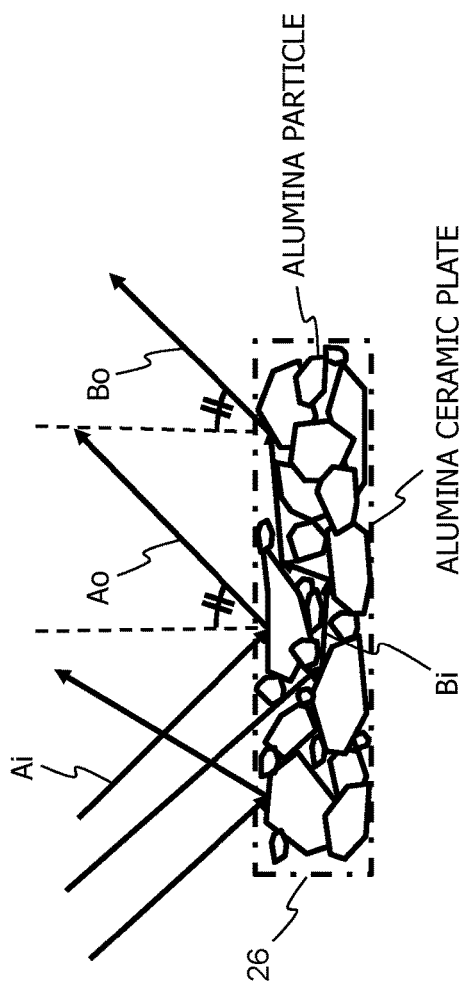
FIG. 18 is a schematic diagram illustrating a cross-sectional view of an alumina ceramic plate as a diffusion plate according to a seventh embodiment.

FIG. 18 is a schematic diagram illustrating a cross-sectional view of an alumina ceramic plate as the diffusion plate 26 in the present embodiment. As illustrated in FIG. 18, the alumina ceramic plate is an aggregate of alumina particles having a random shape, and has a property that allows incoming light to pass through and reflect at random without irregularity processing on the reflecting surface. For this reason, for example, as illustrated in the figure, even the outgoing lights Ao and Bo emitted at the same angle include not only the light passing through the same path but also the light Ai and Bi passing through different paths. That is, since even the light emitted at the same angle includes light having different optical path lengths, this is effective in reducing speckle noise.

Figure 19:
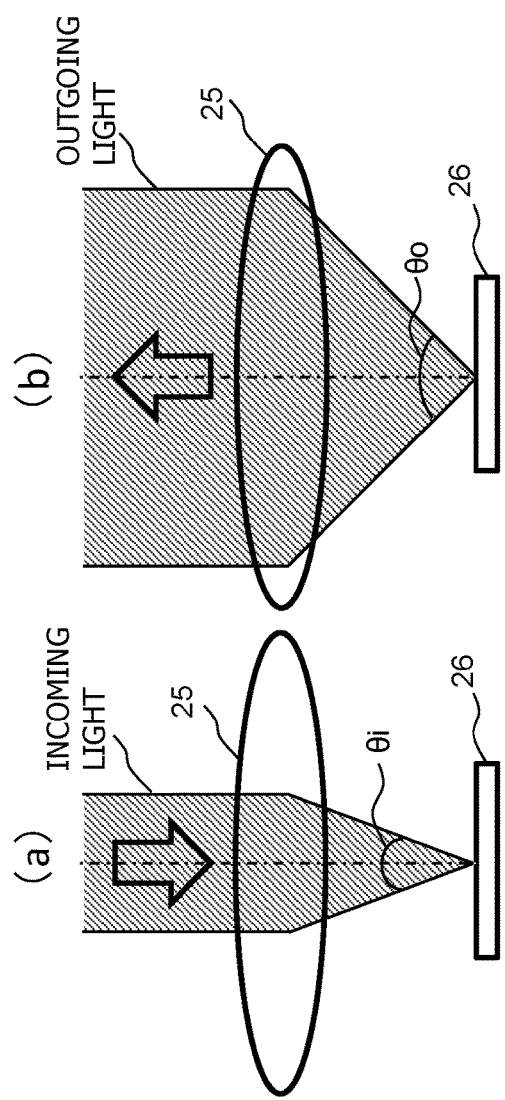
FIG. 19 is a diagram for explaining a light focusing angle θi of incoming light and a diffusion angle θo of outgoing light with respect to the diffusion plate according to the seventh embodiment.
Figure 20:
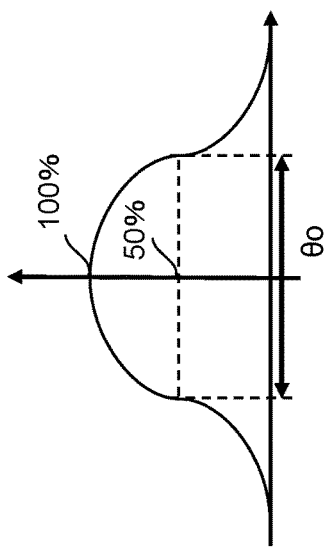
FIG. 20 is a diagram for explaining a definition of the diffusion angle θo of the outgoing light of the diffusion plate according to the seventh embodiment.

Herein, the mechanism of the diffusion plate will be described. FIG. 19 is a diagram for explaining the light focusing angle θi of the incoming light and the diffusion angle θo of the outgoing light with respect to the diffusion plate in the present embodiment. As illustrated in FIG. 19(a), light incident on the diffusion plate 26 is focused by the condenser lens 25 and is incident on the diffusion plate 26 at the light focusing angle θi. In addition, as illustrated in FIG. 19(b), the outgoing light from the diffusion plate 26 is emitted at a diffusion angle θo. Herein, since light generally diffuses, the definition of the diffusion angle θo in the present embodiment will be described with reference to FIG. 20. FIG. 20 illustrates the intensity distribution of the light emitted from the diffusion plate 26, the vertical axis represents the intensity, and the horizontal axis represents the angle of the diffusion light with respect to the normal line to the diffusion plate. As illustrated in FIG. 20, the intensity decreases as the position deviates from the center position, when the peak intensity of the outgoing light is set to 100%, the angle at which the intensity of the outgoing light becomes 50% is defined as the diffusion angle θo of the outgoing light of the diffusion plate in the present embodiment.

Figure 21:
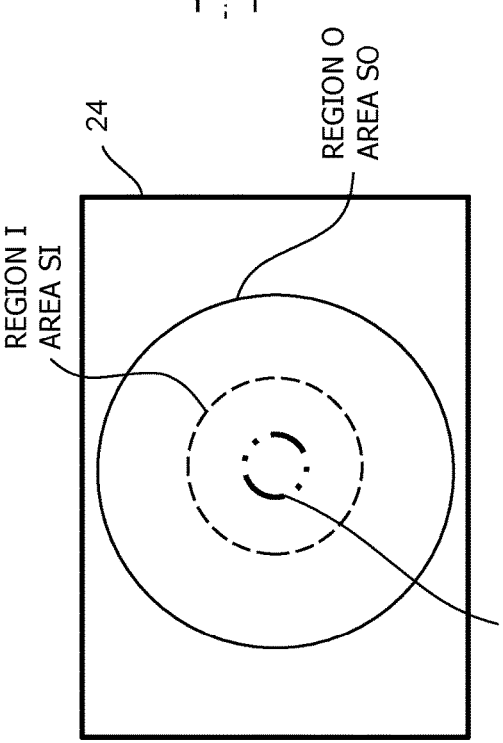
FIG. 21 is an explanatory diagram in which each region of a dichroic mirror according to the seventh embodiment is converted into a circular region.

Next, the relationship of the use efficiency of the B light between the light focusing angle θi of the incoming light, the diffusion angle θo of the outgoing light, illustrated in FIG. 19 is calculated. Herein, in order to simplify the calculation, FIG. 21 illustrates an explanatory diagram of a case where the region I, the region O, the region WI, and the region WO of the dichroic mirror 24 illustrated in FIG. 3C are converted into a model of a circular region. FIG. 21 illustrates a model of a case where the area SWI=the area SWO ($\beta$=1) where the use efficiency of the B light is the highest, as described above. In addition, as the shapes of the different characteristic regions W, any of the shapes illustrated in FIGS. 13B, 13C, and 13D, FIGS. 14B, 14C, and 14D, FIGS. 16B, 16C, and 16D, and FIGS. 17B, 17C, and 17D can be converted into the circular model in FIG. 21.

Figure 22:
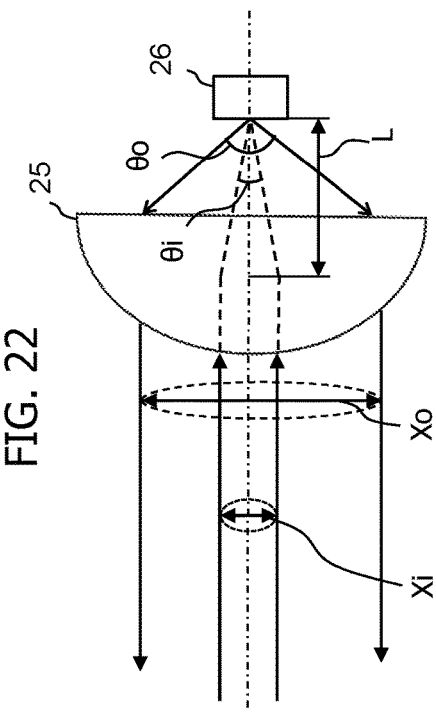
FIG. 22 is a diagram illustrating an optical path near the diffusion plate according to the seventh embodiment and illustrating a relationship of use efficiency of B light between the light focusing angle θi of the incoming light and the diffusion angle θo of the outgoing light.

FIG. 22 illustrates an optical path near the diffusion plate in the present embodiment. In FIG. 22, Xi denotes the diameter of the circular region of the incoming light, and Xo denotes the diameter of the circular region of the outgoing light. In addition, L is a focal length.

Herein, as described in the first embodiment, the B light utilization rate E2 in the configuration of FIG. 3B is R2×T2=R2×(1−(R2×$\beta$/$\alpha$), and the B light utilization rate E1 in the configuration illustrated in FIG. 3A that does not employ the region division of the transmission/reflection characteristics and the diffusion plate is (R1×T1)=R1×(1−R1). In addition, the condition for E2>E1 can be converted into (SO−SWO)/SO>(SI−SWI)/SI as described above in the first embodiment. This equation can be further converted into 1−SWO/SO>1−SWI/SI, and by subtracting 1 from both sides and tidying up the inequality signs, the equation can be converted into SWO/SO<SWI/SI and can be converted into SO/SWO>SI/SWI. Furthermore, when SWO/SWI is multiplied on both sides, this can be converted into SO/SWI>(SI/SWI)×(SWO/SWI).

Herein, SO/SWI denotes the ratio of the area SO (that is, the cross-sectional area of the B light beam returning from the condenser lens 25) of the region O of the B diffusion light returning to the dichroic mirror to the area (that is, the cross-sectional area of the B light beam toward the condenser lens 25) of SWI, which is the size of the different characteristic region WI in the incident region I of the B light in the dichroic mirror and represents the effect of increasing the cross-sectional area of the B light beam by the function of the condenser lens 25 and the diffusion plate 26. Furthermore, SI/SWI is a reciprocal of the real reflectance R2 in the configuration of FIG. 3B. In addition, SWO/SWI is $\beta$ described above. Therefore, SO/SWI>(SI/SWI)×(SWO/SWI) can be converted into SO/SWI>$\beta$/R2.

Herein, in FIG. 3A without employing the region division of the transmission/reflection characteristic and the diffusion plate described above, the suitable B light reflectance is R1=0.2, and as illustrated in FIG. 21, in a case where the different characteristic region WI is included in the incident region I, since β=1, SO/SWI>1/0.2, that is, SO/SWI>5. That is, in order to exceed the B light utilization rate in the type of the related art, by the function of the diffusion plate 26, the area ratio of SO/SWI needs to exceed 5 times.

Since SO is the area of the incident region O of the diffusion light and SWI is the area of the totally reflecting region WI which is a different characteristic region in the incident region I of the B incoming light, SO=π (Xo/2)$^2$ and SWI=π(Xi/2)$^2$ in FIG. 22. Therefore, the condition that the area ratio of SO/SWI exceeds 5 times is π (Xo/2)$^2$>5×π (Xi/2)$^2$. That is, Xo>√5×Xi.

At this time, in FIG. 22, when the light focusing angle θi is represented by Xi and the focal length of the condenser lens 25 is represented by L, the light focusing angle θi=2×arcsine((Xi/2)/L). In addition, when the diffusion angle θo is represented by Xo and the focal length of the condenser lens 25 is represented by L, the diffusion angle θo=2×arcsine ((Xo/2)/L). In consideration of these equations, the condition of the diffusion angle satisfying Xo>√5×Xi, which is the condition that the area ratio of SO/SWI exceeds 5 times, is θo>2×arcsine((√5×Xi/2)/L).

Herein, as a whole scale of the optical system of the =light source apparatus 2, in principle, various optical path lengths and light beam apertures at which the efficiency becomes suitable are determined on the basis of the aperture size of the panel used for the image display elements 6R, 6G, and 6B, and thus, some allowable width exists depending on the design of each optical element. As a specific example, in a case where the aperture size of the panel used for the image display elements 6R, 6G, and 6B is about 0.6 inches, for example, the focal length L in FIG. 22 is preferably about 15 mm, and the area SWI in FIG. 21 is preferably about 35 square mm. In consideration of the possibility of using a panel having a size of, for example, about 0.3 inches to 1.0 inch depending on the model of the projector as the aperture size of the panel used for the image display elements 6R, 6G, and 6B, and further in consideration that there is a width in the design of each optical element of the optical system, the allowable range of the focal length L in FIG. 22 is about 12 mm to 30 mm, and the allowable range of the area SWI in FIG. 21 is about 25 square mm to 42 square mm. In addition, if the allowable range of the area SWI of about 25 square mm to 42 square mm is converted into the range of Xi, the allowable range of Xi is 5.64 mm to 7.31 mm.

Since the characteristics of the diffusion angle of the diffusion plate 26 cannot be easily adjusted by the model of the projector as the aperture size of the panel used for the image display elements 6R, 6G, and 6B and the design parameters of each optical element of the optical system of the light source apparatus 2, in order to reduce the cost of the diffusion plate 26, it is preferable to use a common type of diffusion plate for a plurality of projector models having different aperture sizes of panels. Then, the allowable range of the focal length L in FIG. 22 is about 12 mm to 30 mm, and the allowable range of the area SWI in FIG. 21 is about 25 square mm to 42 square mm (5.64 mm to 7.31 mm in the allowable range of Xi), and in the entire range of both the allowable ranges, it is necessary to obtain the condition of the diffusion angle where the area ratio of SO/SWI exceeds 5 times.

That is, in the entire ranges of the allowable range of the focal length L of about 12 mm to 30 mm and the allowable range of Xi of 5.64 mm to 7.31 mm, diffusion angle θo satisfying the above-described conditional expression of θo>2×arcsine((√5×Xi/2))/L) may be obtained. In the above-described conditional expression, the diffusion angle θo increases as L decreases, and the diffusion angle θo increases as Xi increases. Then, in the above-described allowable ranges of L and Xi, the required value of the diffusion angle θo becomes the largest value in a case where L is 12 mm which is the minimum value of the allowable range and Xi is 7.31 mm which is the maximum value of the allowable range (the area SWI is 25 square mm, which is the minimum value of the allowable range). Therefore, when L=12 mm and Xi=7.31 mm are substituted for the conditional expression θo>2×arcsine((√5×Xi/2)/L), θo>2×arcsine ((√5×7.31/2)/12). When this is calculated, θo>86°.

That is, the diffusion plate used in the projector according to the present embodiment is a diffusion plate capable of exceeding the B light utilization rate in the type of the related art, and as the condition of the lower-cost diffusion plate, the diffusion plate of the type satisfying the diffusion angle θo>86° may be used.

Next, FIG. 23 is a type comparison table comparing the case of using an alumina ceramic plate and the case of other types as examples of the diffusion plate used in the projector according to the present embodiment. In FIG. 23, as the types of the diffusion plate, four types are compared. The type A is a type in which the above-described alumina ceramic plate is used as a reflection-type diffusion plate. The type B is a type in which a frost glass in which both surfaces of the glass roughened by sandblasting or etching and a mirror is added to the back surface thereof is used as a reflection-type diffusion plate. The type C is a type in which a metal subjected to surface irregularity processing is used as a reflection-type diffusion plate. Furthermore, the type D is a type in which a frost glass in which one surface of the glass is roughened by sandblasting or etching and a mirror is added to the back surface thereof is used as a reflection-type diffusion plate. Furthermore, the type D is a type in which a frost glass in which one side of the glass roughened by sandblasting or etching and a mirror added to the back surface thereof is used as a reflection-type diffusion plate (in contrast to the type B, this type may be referred to as a type in which, in the frost glass of this type, only one surface of the glass is changed).

Herein, FIG. 23 illustrates the results of comparison of the substrate material, the processing contents, the diffusion angle θo of the outgoing light, the amount of noise such as speckle, and the cost for each type. First, with respect to the substrate material, in the type A, only the alumina ceramic plate is used, and in the type C, only the metal is used. The type B and the type D require a transparent glass and a mirror. Therefore, in consideration of the cost of the substrate material portion, the type B and the type D which require a plurality of substrate materials are relatively disadvantageous.

In addition, with respect to the processing contents, the type A can be manufactured only by pressing alumina ceramic, and does not require irregularity processing. This is advantageous in terms of processing cost. In addition, the other types B, C, and D require irregularity processing on the reflecting surface, which is disadvantageous in terms of the processing cost.

In addition, with respect to the diffusion angle θo of the outgoing light in the alumina ceramic type of the type A, the outgoing light that is diffused at random is generated without depending on the light focusing angle of the incoming light, and the diffusion angle θo of the outgoing light is as large as about 120°.

Next, in the type B, the diffusion angle of the outgoing light depends on the light focusing angle of the incoming light, and the diffusion angle of the outgoing light is obtained by adding the effect of the increase of the diffusion angle of the diffusion plate to the light focusing angle of the incoming light. For example, if the light focusing angle of the incoming light is about 14°, the effect of the increase of the diffusion angle of the type B is about 30°, so that the final diffusion angle θo of the outgoing light is about 14°+about 30°=about 44°.

In addition, in the type C, random diffused outgoing light is generated without depending on the light focusing angle of the incoming light, and the diffusion angle θo of the outgoing light is about 40°.

Finally, in the type D, the diffusion angle of the outgoing light depends on the light focusing angle of the incoming light, and the diffusion angle of the outgoing light is obtained by adding the effect of the increase of the diffusion angle of the diffusion plate to the light focusing angle of the incoming light. For example, if the light focusing angle of the incoming light is about 14°, the effect of the increase of the diffusion angle of the type D is about 6°, so that the final diffusion angle θo of the outgoing light is about 14°+about 6°=about 20°.

Herein, when comparing the diffusion angles of the outgoing light in the types A, B, C, and D with the above-described conditional expression θo>86° of the diffusion angle of the low-cost diffusion plate in which the B light utilization rate exceeds that in the type of the related art, it can be said that only the alumina ceramic type of the type A exceeds the condition, and this type is more suitable as the diffusion plate used in the projector according to the present embodiment. In the other three types, this condition is not satisfied.

Next, with respect to the noise such as speckles, the type A and the type B are small, while the type C and the type D are medium or large. In terms of this point, the alumina ceramic type of the type A is relatively good Finally, with respect to the overall cost in consideration of the substrate material and the processing contents, the type B and the type D, which require a plurality of substrate materials, need to be expensive, but the type A and the type C are relatively inexpensive. In terms of overall cost, the alumina ceramic type of the type A is relatively good.

As described above, the diffusion plate used in the projector according to the present embodiment is advantageous in terms of any of the comparison items, and in particular, the diffusion angle θo of the outgoing light sufficiently satisfies the above-described conditional expression of the diffusion angle, and noise such as speckle is also reduced, and thus, it can be understood that it is advantageous to employ a relatively inexpensive alumina ceramic type diffusion plate.

According to the projector according to the present embodiment described above, it is possible to provide an inexpensive projector having a higher B light utilization rate by using a diffusion plate having a diffusion angle of the outgoing light satisfying θo>86°. In particular, by employing a diffusion plate using alumina ceramic, it is possible to realize a more suitable projector.

Although the embodiments have been described above, the present invention is not limited to the above-described embodiments, and various modified examples are included. In addition, the above-described embodiments have been described in detail for easy understanding of the present invention, and thus, the embodiments are not necessarily limited to those having all the configurations described above. In addition, a portion of the configurations of the embodiments can be replaced with other configurations.

REFERENCE SIGNS LIST

1 Optical system
2 Light source apparatus
3 Illumination optical system
4 Color separating optical system
6R, 6G, 6B Image display element
7 Light combining optical system
8 Projection lens
21, 21-1, 21-2, 21-3 Light source
22, 23 Lens
24, 91, 92, 93 Dichroic mirror
25, 27 Condenser lens
26 Diffusion plate
28 Phosphor wheel
29 Motor

The invention claimed is:

1. A projector comprising:
a white light generator that uses a blue laser as a light source to generate blue light and yellow light based on the blue laser and generates white light including the generated blue light and yellow light; and
an optical system that modulates light based on the white light generated by the white light generator with an image display element and projects the modulated light,
wherein the white light generator is configured to include:
a dichroic mirror that is irradiated with the blue light from the blue laser as the light source;
a first condenser lens that focuses blue light being reflected by or passing through the dichroic mirror;
a diffusion plate that diffuses the blue light focused by the first condenser lens;
a second condenser lens that focuses the blue light passing through or being reflected by the dichroic mirror;
a phosphor that is irradiated with the blue light focused by the second condenser lens to emit yellow light,
wherein the diffusion plate is an alumina ceramic plate,
wherein the dichroic mirror has a first region having a characteristic of transmitting one of the blue light and the yellow light and reflecting the other and a second region having a characteristic of reflecting or transmitting both the blue light and the yellow light,
wherein the blue light included in the white light output by the white light generator is obtained by allowing the blue light diffused by the diffusion plate to pass through the first condenser lens and performing reflection or transmission of the dichroic mirror, and
wherein the yellow light included in the white light output by the white light generator is obtained by allowing the yellow light emitted from the phosphor to pass through the second condenser lens and performing reflection or transmission of the dichroic mirror.

2. A projector comprising:
a white light generator that uses a blue laser as a light source to generate blue light and yellow light based on the blue laser and generates white light including the generated blue light and yellow light; and
an optical system that modulates light based on the white light generated by the white light generator with an image display element and projects the modulated light, wherein the white light generator is configured to include:
a dichroic mirror that is irradiated with the blue light from the blue laser as the light source;
a first condenser lens that focuses blue light being reflected by or passing through the dichroic mirror;
a diffusion plate that diffuses the blue light focused by the first condenser lens;
a second condenser lens that focuses the blue light passing through or being reflected by the dichroic mirror;
a phosphor that is irradiated with the blue light focused by the second condenser lens to emit yellow light,
wherein the diffusion angle θo of the outgoing light of the diffusion plate exceeds 86°,
wherein the dichroic mirror has a first region having a characteristic of transmitting one of the blue light and the yellow light and reflecting the other and a second region having a characteristic of reflecting or transmitting both the blue light and the yellow light,
wherein the blue light included in the white light output by the white light generator is obtained by allowing the blue light diffused by the diffusion plate to pass through the first condenser lens and performing reflection or transmission of the dichroic mirror, and
wherein the yellow light included in the white light output by the white light generator is obtained by allowing the yellow light emitted from the phosphor to pass through the second condenser lens and performing reflection or transmission of the dichroic mirror.

3. The projector according to claim 2, wherein the diffusion plate is an alumina ceramic plate.

4. The projector according to claim 1,
wherein the dichroic mirror has a region having blue light transmission/yellow light reflection characteristics as the first region and has a region of totally reflecting characteristic as the second region,
wherein the blue light included in the white light output from the white light generator is light obtained by allowing the blue light diffused by the diffusion plate to pass through the first condenser lens, to be irradiated to the dichroic mirror, and to pass through the first region, and
wherein the yellow light included in the white light output from the white light generator is light obtained by allowing the yellow light emitted from the phosphor to pass through the second condenser lens, to be irradiated to the dichroic mirror, and to be reflected by the first region.

5. The projector according to claim 1,
wherein the dichroic mirror has a region having blue light reflection/yellow light transmission characteristics as the first region and has a region of totally transmitting characteristic as the second region,
wherein the blue light included in the white light output from the white light generator is light obtained by allowing the blue light diffused by the diffusion plate to pass through the first condenser lens, to be irradiated to the dichroic mirror, and to be reflected by the first region, and
wherein the yellow light included in the white light output from the white light generator is light obtained by allowing the yellow light emitted from the phosphor to pass through the second condenser lens, to be irradiated to the dichroic mirror, and to pass through the first region.

6. The projector according to claim 2,
wherein the dichroic mirror has a region having blue light transmission/yellow light reflection characteristics as the first region and has a region of totally reflecting characteristic as the second region,
wherein the blue light included in the white light output from the white light generator is light obtained by allowing the blue light diffused by the diffusion plate to pass through the first condenser lens, to be irradiated to the dichroic mirror, and to pass through the first region, and
wherein the yellow light included in the white light output from the white light generator is light obtained by allowing the yellow light emitted from the phosphor to pass through the second condenser lens, to be irradiated to the dichroic mirror, and to be reflected by the first region.

7. The projector according to claim 2,
wherein the dichroic mirror has a region having blue light reflection/yellow light transmission characteristics as the first region and has a region of totally transmitting characteristic as the second region,
wherein the blue light included in the white light output from the white light generator is light obtained by allowing the blue light diffused by the diffusion plate to pass through the first condenser lens, to be irradiated to the dichroic mirror, and to be reflected by the first region, and
wherein the yellow light included in the white light output from the white light generator is light obtained by allowing the yellow light emitted from the phosphor to pass through the second condenser lens, to be irradiated to the dichroic mirror, and to pass through the first region.

8. The projector according to claim 3,
wherein the dichroic mirror has a region having blue light transmission/yellow light reflection characteristics as the first region and has a region of totally reflecting characteristic as the second region,
wherein the blue light included in the white light output from the white light generator is light obtained by allowing the blue light diffused by the diffusion plate to pass through the first condenser lens, to be irradiated to the dichroic mirror, and to pass through the first region, and
wherein the yellow light included in the white light output from the white light generator is light obtained by allowing the yellow light emitted from the phosphor to pass through the second condenser lens, to be irradiated to the dichroic mirror, and to be reflected by the first region.

9. The projector according to claim 3,
wherein the dichroic mirror has a region having blue light reflection/yellow light transmission characteristics as the first region and has a region of totally transmitting characteristic as the second region,
wherein the blue light included in the white light output from the white light generator is light obtained by allowing the blue light diffused by the diffusion plate to pass through the first condenser lens, to be irradiated to the dichroic mirror, and to be reflected by the first region, and
wherein the yellow light included in the white light output from the white light generator is light obtained by allowing the yellow light emitted from the phosphor to pass through the second condenser lens, to be irradiated to the dichroic mirror, and to pass through the first region.

* * * * *